(12) United States Patent
Horiuchi et al.

(10) Patent No.: US 11,191,069 B2
(45) Date of Patent: *Nov. 30, 2021

(54) BASE STATION, TERMINAL, AND COMMUNICATION METHOD

(71) Applicant: Panasonic Intellectual Property Corporation of America, Torrance, CA (US)

(72) Inventors: Ayako Horiuchi, Kanagawa (JP); Lilei Wang, Beijing (CN); Alexander Golitschek Edler von Elbwart, Hessen (DE); Masayuki Hoshino, Kanagawa (JP); Yasuaki Yuda, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/746,221

(22) Filed: Jan. 17, 2020

(65) Prior Publication Data

US 2020/0154420 A1    May 14, 2020

Related U.S. Application Data

(63) Continuation of application No. 16/070,264, filed as application No. PCT/CN2016/073610 on Feb. 5, 2016, now Pat. No. 10,575,297.

(51) Int. Cl.
*H04W 4/00* (2018.01)
*H04W 72/04* (2009.01)
(Continued)

(52) U.S. Cl.
CPC .............. *H04W 72/042* (2013.01); *H04L 1/00* (2013.01); *H04L 1/0003* (2013.01);
(Continued)

(58) Field of Classification Search
None
See application file for complete search history.

(56) References Cited

U.S. PATENT DOCUMENTS 9,265,054 B2    2/2016  Miyauchi
2008/0020779 A1  1/2008  Ode et al.
(Continued)

FOREIGN PATENT DOCUMENTS

CN    104468030 A    3/2015
JP    2011-91843 A    5/2011
(Continued)

OTHER PUBLICATIONS

3Gpp, "3rd Generation Partnership Project; Technical Specification Group Radio Access Network; Evolved Universal Terrestrial Radio Access (E-UTRA); Physical channels and modulation (Release 13)," 3GPP TS 36.211 V13.0.0 (Dec. 2015), Technical Specification, Dec. 2015, 142 pages.
(Continued)

*Primary Examiner* — Phirin Sam
(74) *Attorney, Agent, or Firm* — Seed IP Law Group LLP

(57) ABSTRACT

A base station is disclosed that enables an efficient use of resources even when a TTI length is shortened. In this base station, a PDCCH section (103) generates one piece of downlink control information (DCI) containing control information for a plurality of first transmission time intervals (TTIs) each having a TTI length shorter than a second TTI, and a transmission section (107) transmits the DCI. Control information on retransmission processing for a data signal is configured for each of the plurality of first TTIs while control information other than the control information on the retransmission processing is configured in common among the plurality of first TTIs in the DCI.

16 Claims, 17 Drawing Sheets

(51) Int. Cl.
*H04L 1/00* (2006.01)
*H04L 1/18* (2006.01)
*H04L 5/00* (2006.01)

(52) U.S. Cl.
CPC .......... *H04L 1/1812* (2013.01); *H04L 5/0048* (2013.01); *H04L 5/0055* (2013.01); *H04W 72/0406* (2013.01); *H04W 72/0446* (2013.01)

(56) References Cited

U.S. PATENT DOCUMENTS

| | | |
|---|---|---|
| 2011/0032894 A1 | 2/2011 | Miki et al. |
| 2013/0058282 A1 | 3/2013 | Miki et al. |
| 2014/0198743 A1* | 7/2014 | Suzuki ................. H04W 52/18 370/329 |
| 2015/0215875 A1* | 7/2015 | Nakashima ........... H04W 52/24 370/336 |
| 2016/0345311 A1* | 11/2016 | Chen ................. H04W 72/0446 |
| 2017/0164363 A1 | 6/2017 | Zhang et al. |
| 2017/0188347 A1 | 6/2017 | Chen et al. |
| 2017/0230994 A1* | 8/2017 | You ....................... H04L 5/0053 |
| 2017/0264417 A1 | 9/2017 | Eriksson et al. |
| 2017/0318564 A1* | 11/2017 | Lee ....................... H04L 5/0092 |
| 2017/0325164 A1 | 11/2017 | Lee et al. |
| 2018/0123769 A1* | 5/2018 | Pelletier ................ H04L 5/0094 |
| 2018/0255536 A1 | 9/2018 | Suzuki et al. |
| 2018/0324834 A1 | 11/2018 | Sebire et al. |
| 2019/0357240 A1* | 11/2019 | Kim ....................... H04W 76/14 |
| 2020/0154420 A1* | 5/2020 | Horiuchi ........... H04W 72/0406 |
| 2020/0374094 A1* | 11/2020 | Pelletier ................ H04L 5/0094 |
| 2021/0100020 A1* | 4/2021 | Oh ........................ H04L 5/0044 |

FOREIGN PATENT DOCUMENTS

| | | |
|---|---|---|
| WO | 2012/063368 A1 | 5/2012 |
| WO | 2016/029736 A1 | 3/2016 |

OTHER PUBLICATIONS

Ericsson, "New SI proposal: Study on Latency reduction techniques for LTE," RP-150465, 3GPP TSG RAN Meeting #67, Shanghai, China, Mar. 9-12, 2015, 8 pages.

International Search Report, dated Oct. 26, 2016, for International Application No. PCT/CN2016/073610, 4 pages.

* cited by examiner

| | DCI format | Common or each TTI |
|---|---|---|
| TTI assignment (New) | ALL | Each TTI |
| Carrier indicator - 0 or 3 bits for cross carrier scheduling | ALL | Common |
| Flag for format0/format1A differentiation | Format 1A | Common |
| Localized/Distributed VRB assignment flag | ALL | Common |
| Resource block assignment | ALL | Common |
| Modulation and coding scheme | ALL | Common |
| HARQ process number | ALL | Each TTI |
| New data indicator | ALL | Each TTI |
| Redundancy version | ALL | Each TTI |
| TPC command for PUCCH | ALL | One value for UL |
| Downlink Assignment Index for TDD | ALL | |
| SRS request | Format 1A, 2B, 2C, 2D | One value for UL |
| HARQ-ACK resource offset For EPDCCH | ALL | One value for UL |
| TPMI information for precoding | Format 1B, 1D | Common |
| PMI confirmation for precoding | Format 1B | Common |
| Transport block to codeword swap flag | Format 2, 2A | Each TTI |
| Precoding information | Format 2, 2A | Common |
| Scrambling identity | Format 2B | Common |
| Antenna port(s), scrambling identity and number of layers | Format 2C, 2D | Common |
| PDSCH RE Mapping and Quasi-Co-Location Indicator | Format 2D | Common |

FIG. 7

|  | DCI format | Common or each TTI |
|---|---|---|
| TTI assignment (New) | Format 0, 4 | Each TTI |
| Carrier indicator - 0 or 3 bits for cross carrier scheduling | Format 0, 4 | Common |
| Flag for format0/format1A differentiation | Format 0 | Common |
| Frequency hopping flag | Format 0 | Common |
| Resource block assignment | Format 0, 4 | Common |
| Modulation and coding scheme | Format 0, 4 | Common |
| New data indicator | Format 0, 4 | Each TTI |
| TPC command for scheduled PUSCH | Format 0, 4 | Common |
| Cyclic shift for DM RS and OCC index | Format 0, 4 | Common |
| UL index for TDD config0 | Format 0, 4 | Common |
| Downlink Assignment Index (DAI) for TDD | Format 0, 4 | Common |
| CSI request | Format 0, 4 | Common |
| SRS request | Format 0, 4 | Common |
| Resource allocation type | Format 0, 4 | Common |
| Precoding information and number of layers | Format 4 | Common |

FIG. 9

| TTI# in a DL subframe | SC-FDMA symbol |
|---|---|
| 1st TTI | #0,1 in 1st slot |
| 2nd TTI | #5,6 in 1st slot |
| 3rd TTI | #0,1 in 2nd slot |
| 4th TTI | #5,6 in 2nd slot |

FIG. 13

| TTI# in a DL subframe | SC-FDMA symbol |
|---|---|
| 1st TTI, 2nd TTI, 3rd TTI, 4th TTI | #0,1 in 1st slot |
| 5th TTI, 6th TTI, 7th TTI | #5,6 in 1st slot |
| 8th TTI, 9th TTI, 10th TTI 11th TTI | #0,1 in 2nd slot |
| 12th TTI,13th TTI, 14th TTI | #5,6 in 2nd slot |

FIG. 15

| ACK(CW0), ACK(CW1) | Spatial-bundled state |
|---|---|
| ACK, ACK | ACK |
| ACK, NACK | NACK |
| NACK, ACK | NACK |
| NACK, NACK | NACK |

FIG. 16

| 3 to 2 bundling | |
|---|---|
| HARQ-ACK(0), HARQ-ACK(1), HARQ-ACK(2) | Time-domain-bundled state |
| A, A, A | A, A |
| A, A, N | N, A |
| A, N, any | A, N |
| N, any, any | N, N |

| 4 to 2 bundling | |
|---|---|
| HARQ-ACK(0), HARQ-ACK(1), HARQ-ACK(2), HARQ-ACK(3) | Time-domain-bundled state |
| A, A, A, A | A, N |
| A, A, A, N | A, A |
| A, A, N, any | N, A |
| N, any, any, any or A, N, any, any | N, N |

FIG. 17

| SC-FDMA | TTI | TTI | TTI | TTI | | QPSK or BPSK |
|---|---|---|---|---|---|---|
| #0,1 | 1st TTI | 2nd TTI | 3rd TTI | 4th TTI | | QPSK |
| in 1st slot | ACK | NACK | - | - | ACK,NACK | j |
| #5,6 | 5th TTI | 6th TTI | 7th TTI | - | | QPSK |
| in 1st slot | ACK | ACK | ACK | | ACK,ACK | -1 |
| #0,1 | 8th TTI | 9th TTI | 10th TTI | 11th TTI | | QPSK |
| in 2nd slot | ACK/ACK | ACK/ACK | NACK/ACK | ACK/NACK | NACK,ACK | -j |
| #5,6 | 12th TTI | 13th TTI | 14th TTI | | | QPSK |
| in 2nd slot | NACK/NACK | - | - | | NACK,NACK | 1 |

FIG. 18

| X to 2 bundling ||
|---|---|
| HARQ-ACK(0), ···HARQ-ACK(X-1) | Time-domain-bundled state |
| ALL A | A, N |
| A, A, A,···N(HARQ-ACK(X-1)) | A, A |
| A, A, N, any,···any | N, A |
| N, any, ···, any or<br>A, N, any, ···any | N, N |

FIG. 19

BASE STATION, TERMINAL, AND COMMUNICATION METHOD

TECHNICAL FIELD

The present disclosure relates to a base station, a terminal, and a communication method.

BACKGROUND ART

In recent years, development of applications that require delay time reduction (delay critical) has been considered. Examples of such applications that require delay time reduction include autonomous vehicle driving, augmented reality applications in smart glasses, or inter-machine communication.

In 3GPP, in order to develop these applications, latency reduction for reducing the packet data latency has been studied (see Non-Patent Literature 1). In latency reduction, shortening (reducing) the length of a transmission time interval (TTI) (TTI length), which is the time unit for transmission and reception of data, to be a time length between 0.5 msec and one orthogonal frequency division multiplexing (OFDM) symbol has been considered. Note that, the traditional TTI length is 1 msec, which is equal to the unit called "subframe." One subframe is composed of two slots (one slot has a time length of 0.5 msec). One slot is composed of seven OFDM symbols for normal cyclic prefix (CP) and of six OFDM symbols for extended CP.

FIG. 1 illustrates an example of shortened TTIs for normal CP. When the TTI length is 0.5 msec (=1 slot), two TTIs are set per msec. When one slot is divided into a TTI composed of four OFDM symbols and a TTI composed of three OFDM symbols, four TTIs are set per msec. When the TTI length is one OFDM symbol, fourteen TTIs are set per msec.

Shortening the TTI length makes it possible to reduce latency for CQI reporting and thus to increase the frequency of CQI reporting, which is advantageous in that the difference between CQI reporting and actual channel quality is reduced.

CITATION LIST

Non-Patent Literature

NPL 1
RP-150465, "New SI proposal: Study on Latency reduction techniques for LTE," Ericsson, Huawei, March 2015
NPL 2
3GPP TS 36.211 V13.0.0, "Physical channels and modulation (Release 13)," December 2015

SUMMARY OF INVENTION

Technical Problem

When the TTI length is shortened, a base station (also referred to as "eNB") may transmit downlink control information (DCI) for each shortened TTI in order to notify a terminal (user equipment (UE)) of a resource allocation and modulation and coding scheme (MCS) from the base station.

As illustrated in FIG. 2, however, transmitting a DCI having the amount of information equal to a DCI for the traditional TTI having a TTI length of 1 msec (enhanced physical downlink control channel (EPDCCH) in FIG. 2) for each TTI requires a control signal multiplied by the number of TTIs per msec as compared to the related art. Accordingly, there arises a problem in that the proportion of the control signal in the resources increases in this case, thus reducing the system throughput.

An aspect of the present disclosure is to provide a base station, a terminal, and a communication system each enabling an efficient use of resources even when the TTI length is shortened.

A base station according to an aspect of the present disclosure includes: a generation section that generates one piece of downlink control information (DCI) containing control information for a plurality of first transmission time intervals (TTIs) each having a TTI length shorter than a second TTI; and a transmission section that transmits the DCI, in which control information on retransmission processing for a data signal is configured for each of the plurality of first TTIs while control information other than the control information on the retransmission processing is configured in common among the plurality of first TTIs in the DCI.

A terminal according to an aspect of the present disclosure includes: a reception section that receives one piece of downlink control information (DCI) containing control information for a plurality of first transmission time intervals (TTIs) each having a TTI length shorter than a second TTI; a signal demultiplexing section that demultiplexes a downlink data signal from a received signal using the DCI; and a signal assignment section that assigns an uplink data signal to an uplink resource using the DCI, in which control information on retransmission processing for a data signal is configured for each of the plurality of first TTIs while control information other than the control information on the retransmission processing is configured in common among the plurality of first TTIs in the DCI.

A communication method according to an aspect of the present disclosure includes: generating one piece of downlink control information (DCI) containing control information for a plurality of first transmission time intervals (TTIs) each having a TTI length shorter than a second TTI; and transmitting the DCI, in which control information on retransmission processing for a data signal is configured for each of the plurality of first TTIs while control information other than the control information on the retransmission processing is configured in common among the plurality of first TTIs in the DCI.

Another communication method according to an aspect of the present disclosure includes: receiving one piece of downlink control information (DCI) containing control information for a plurality of first transmission time intervals (TTIs) each having a TTI length shorter than a second TTI; demultiplexing a downlink data signal from a received signal using the DCI; and assigning an uplink data signal to an uplink resource using the DCI, in which control information on retransmission processing for a data signal is configured for each of the plurality of first TTIs while control information other than the control information on the retransmission processing is configured in common among the plurality of first TTIs in the DCI.

Note that the comprehensive or specific aspects mentioned above may be implemented by a system, apparatus, method, integrated circuit, computer program, or recoding medium, or any combination of the system, apparatus, method, integrated circuit, computer program, and recoding medium.

Advantageous Effects of Invention

According to an aspect of this disclosure, an efficient use of resources is enabled even when the TTI length is shortened.

The specification and drawings reveal more advantages and effects in an aspect of this disclosure. Such advantages and/or effects are provided by the features disclosed in several embodiments as well as the specification and drawings, but all of them do not have to be provided in order to obtain one or more identical features.

BRIEF DESCRIPTION OF DRAWINGS

FIG. 7 is a diagram illustrating an example of DL control information contained in a DCI according to Embodiment 1;

FIG. 9 is a diagram illustrating an example of UL control information contained in a DCI according to Embodiment 1;

FIG. 13 is a diagram illustrating PUCCH resources for transmitting ACK/NACK signals in a case of four TTIs per subframe according to Embodiment 2;

FIG. 15 is a diagram illustrating PUCCH resources for transmitting ACK/NACK signals in a case of fourteen TTIs per subframe according to Embodiment 2;

FIG. 16 is a diagram illustrating an example of spatial bundling;

FIG. 17 is a diagram illustrating an example of time domain bundling;

FIG. 18 is a diagram illustrating an example of generating ACK/NACK signals according to Operation Example 1 of Embodiment 2; and FIG. 19 is a diagram illustrating an example of generating ACK/NACK signals according to Operation Example 2 of Embodiment 2.

DESCRIPTION OF EMBODIMENTS

Hereinafter, a detailed description will be given of embodiments of the present disclosure with reference to the drawings.

[Summary of Communication System]

A communication system according to the embodiments of the present disclosure includes base station 100 and terminal 200.

Figure 1:
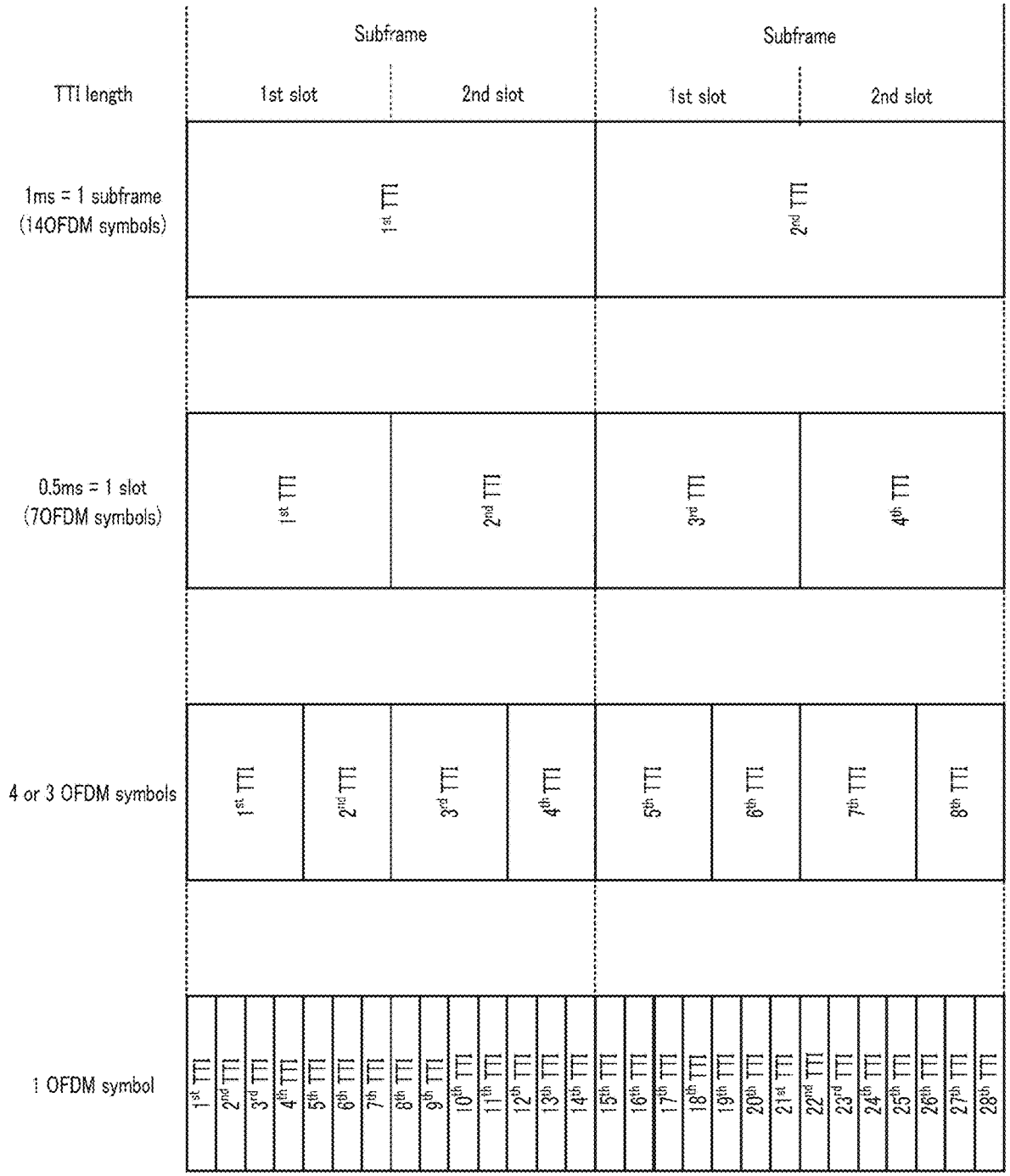
FIG. 1 is a diagram illustrating exemplary TTI lengths.
Figure 2:
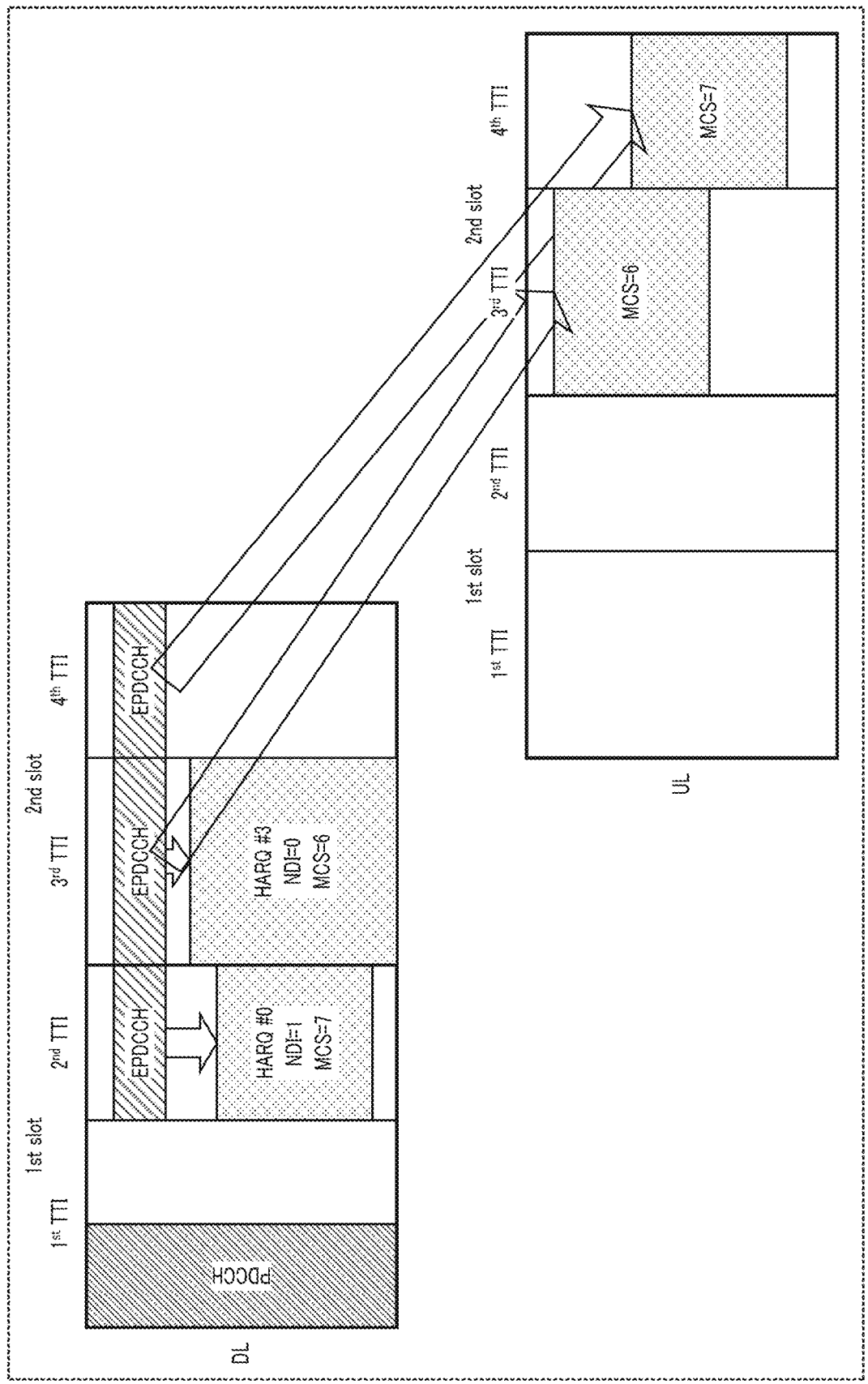
FIG. 2 is a diagram provided for describing a problem to be solved by an aspect of the present disclosure.
Figure 3:
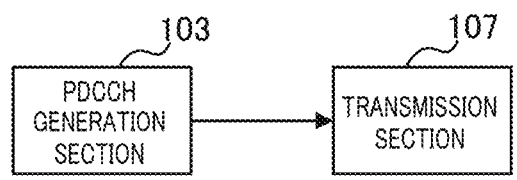
FIG. 3 is a block diagram illustrating a main configuration of a base station according to Embodiment 1.

FIG. 3 is a block diagram illustrating a main configuration of base station 100 according to an embodiment of the present disclosure. In base station 100 illustrated in FIG. 3, PDCCH generation section 103 generates a single piece of downlink control information (DCI) containing control information for a plurality of first transmission time intervals (TTIs) each having a shorter TTI length than a second TTI. Transmission section 107 transmits the DCI.

Figure 4:
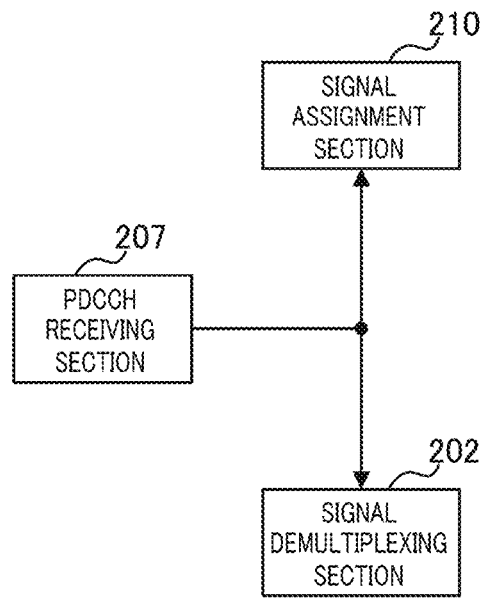
FIG. 4 is a block diagram illustrating a main configuration of a terminal according to Embodiment 1.

FIG. 4 is a block diagram illustrating a main configuration of terminal 200 according to the embodiments of the present disclosure. In terminal 200 illustrated in FIG. 4, PDCCH receiving section 207 receives a single piece of downlink control information (DCI) containing control information for a plurality of first transmission time intervals (TTI) each having a shorter TTI length than a second TTI. In addition, signal demultiplexing section 202 demultiplexes a downlink data signal from a received signal using the DCI, and signal assignment section 210 assigns an uplink data signal to an uplink resource in terminal 200.

Note that, control information on retransmission processing for a data signal is configured for each of the plurality of first TTIs while control information other than the retransmission processing is configured in common among the plurality of first TTIs (configured to be shared among the plurality of first TTIs).

Embodiment 1

[Configuration of Base Station]

Figure 5:
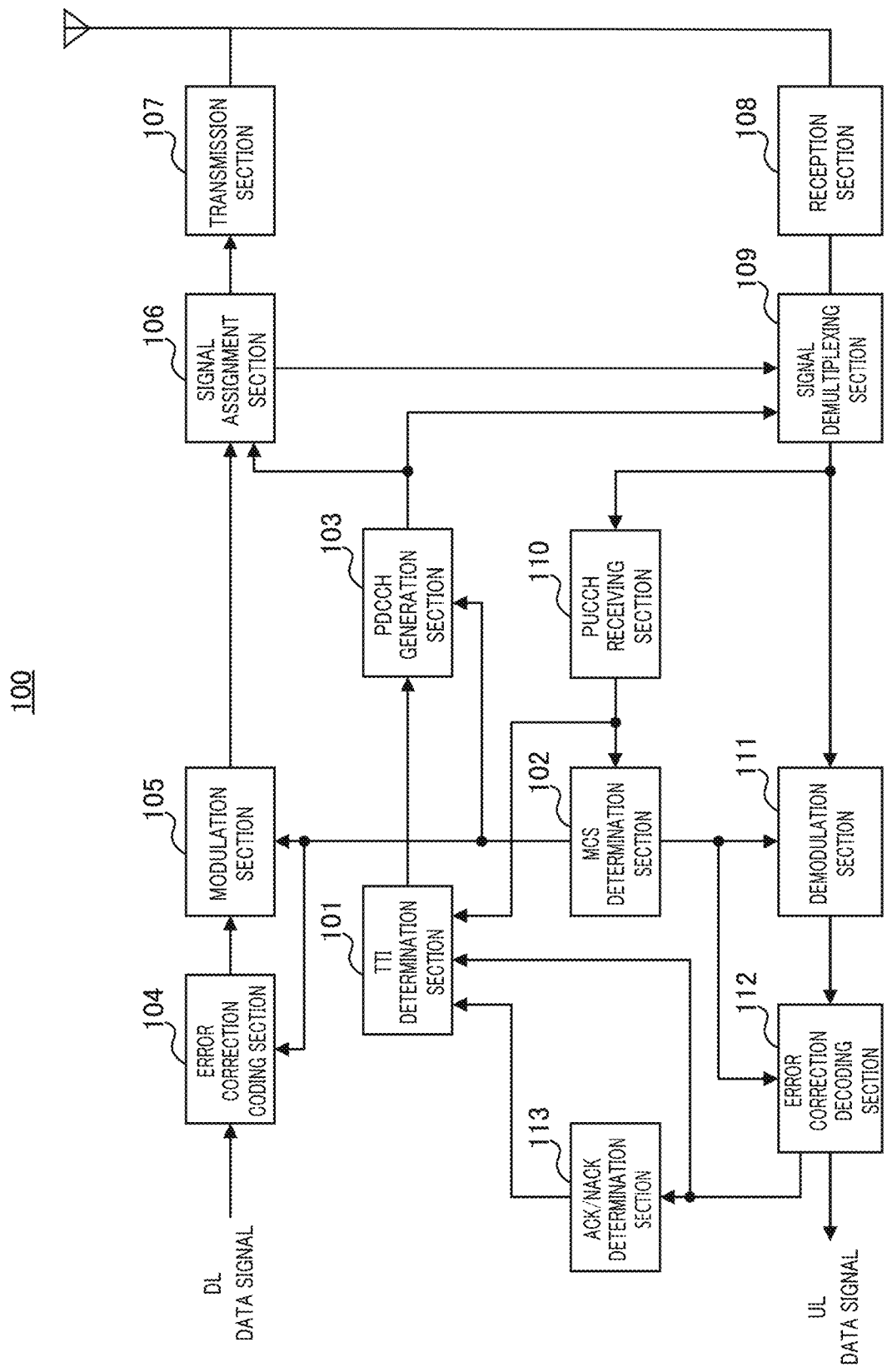
FIG. 5 is a block diagram illustrating a configuration of the base station according to Embodiment 1.

FIG. 5 is a block diagram illustrating a configuration of base station 100 according to Embodiment 1. In FIG. 5, base station 100 includes TTI determination section 101, MCS determination section 102, physical downlink control channel (PDCCH) generation section 103, error correction coding section 104, modulation section 105, signal assignment section 106, transmission section 107, reception section 108, signal demultiplexing section 109, physical uplink control channel (PUCCH) receiving section 110, demodulation section 111, error correction decoding section 112, and ACK/NACK determination section 113.

TTI determination section 101 determines, when a resource is allocated to a plurality of TTIs using a single DCI, a TTI to which the resource is allocated among the plurality of TTIs. TTI determination section 101 outputs information indicating the presence or absence of allocation for each of the plurality of TTIs (TTI information) to PDCCH generation section 103.

More specifically, for downlink (DL) allocation, TTI determination section 101 determines a TTI that requires retransmission, based on an ACK/NACK signal transmitted while being mapped to PUCCH and inputted from PUCCH receiving section 110, or an ACK/NACK signal transmitted while being multiplexed on an uplink (UL) data signal and inputted from error correction decoding section 112, and determines a TTI to which a resource is allocated, based on the result of determination. In addition, TTI determination section 101 determines the assignment of new data for each TTI, taking into account the amount of data inputted from a DL data signal buffer (not illustrated) and allocation for another UE.

Meanwhile, for UL allocation, TTI determination section 101 determines a TTI that requires retransmission, based on an ACK/NACK signal for the UL data that is inputted from ACK/NACK determination section 113, and determines a TTI to which a resource is allocated, based on the result of determination. In addition, TTI determination section 101 determines the assignment of new data for each TTI, taking into account the amount of data acquired from a buffer status report of the UL data signal transmitted from a UE (not illustrated) and allocation for another UE.

MCS determination section 102 determines a DL MCS based on CQI information and an ACK/NACK signal for the DL data signal that are inputted from PUCCH receiving section 110. Moreover, MCS determination section 102 determines the UL MCS based on a sounding reference signal (SRS) transmitted separately or the reception quality of the UL data signal. MCS determination section 102 outputs information indicating the determined DL and UL MCSs (MCS information) to PDCCH generation section 103. MCS determination section 102 outputs the DL MCS to error correction coding section 104 and modulation section 105 and outputs the UL MCS to demodulation section 111 and error correction decoding section 112.

PDCCH generation section 103 generates PDCCH or EPDCCH to which a plurality of TTIs is assigned. Note that, PDCCH is mapped to the top OFDM symbol (the number of symbols: 1, 2, or 3) within the subframe, and EPDCCH is mapped to an OFDM symbol other than the OFDM symbol to which PDCCH is mapped within the subframe.

More specifically, PDCCH generation section 103 configures a new data indicator (NDI) for the TTI in which DL and UL assignment are performed, based on the TTI information received from TTI determination section 101. For the DL assignment, PDCCH generation section 103 further configures an HARQ number (HARQ process number) and redundancy version for the TTI. In addition, PDCCH generation section 103 generates DL and UL resource allocation information as information common to the plurality of TTIs. PDCCH generation section 103 generates one DCI containing control information on assignments for these TTIs and TTI information. PDCCH generation section 103 generates PDCCH or EPDCCH using the MCS information received from MCS determination section 102 and outputs the generated PDCCH or EPDCCH to signal assignment section 106 and signal demultiplexing section 109.

Error correction coding section 104 applies error correction coding to a transmission data signal (DL data signal) or higher layer signaling based on the DL MCS information received from MCS determination section 102 and outputs the coded signal to modulation section 105.

Modulation section 105 applies modulation processing to the signal received from error correction coding section 104, based on the DL MCS information received from MCS determination section 102, and outputs the modulated data signal to signal assignment section 106.

Signal assignment section 106 assigns the signal received from modulation section 104 (including the data signal) and the control signal (PDCCH or EPDCCH) received from PDCCH generation section 103 to a predetermined downlink resource. The assignments of the control signal (PDCCH or EPDCCH) and data signal (PDSCH) to the predetermined resource form a transmission signal. The transmission signal thus formed is outputted to transmission section 107.

Transmission section 107 applies radio transmission processing such as up-conversion to the transmission signal received from signal assignment section 106 and transmits the processed transmission signal to terminal 200 via an antenna.

Reception section 108 receives, via an antenna, the signal transmitted from terminal 200 and applies radio reception processing such as down-conversion to the received signal, and outputs the processed received signal to signal demultiplexing section 109.

Signal demultiplexing section 109 demultiplexes the UL data signal from the received signal based on the information received from PDCCH generation section 103 and outputs the UL data signal to demodulation section 111, and also demultiplexes a signal in the PUCCH resource (PUCCH signal including ACK/NACK signal) from the received signal and outputs the signal to PUCCH receiving section 110.

PUCCH receiving section 110 extracts an ACK/NACK signal for the DL data signal from the PUCCH signal received from signal demultiplexing section 109 and outputs the ACK/NACK signal to TTI determination section 101 and MCS determination section 102. Moreover, PUCCH receiving section 110 extracts CQI information from the PUCCH signal received from signal demultiplexing section 109 and outputs the CQI information to MCS determination section 102.

Demodulation section 111 applies demodulation processing to the signal received from signal demultiplexing section 109, based on the UL MCS information (modulation information) received from MCS determination section 102, and outputs the resultant signal to error correction decoding section 112.

Error correction decoding section 112 decodes the signal received from demodulation section 111, based on the UL MCS information (error coding information) received from MCS determination section 102, and acquires the received data signal (UL data signal) from terminal 200. Error correction decoding section 112 outputs the UL data signal to ACK/NACK determination section 113. Moreover, error correction decoding section 112 extracts the ACK/NACK signal for the DL data signal, which is transmitted while being multiplexed on the UL data signal, and outputs the extracted ACK/NACK signal to TTI determination section 101.

ACK/NACK determination section 113 detects whether the UL data signal received from error correction coding section 112 has an error, using cyclic redundancy check (CRC), and outputs the result of detection to TTI determination section 101 as the UL ACK/NACK signal.

[Configuration of Terminal]

Figure 6:
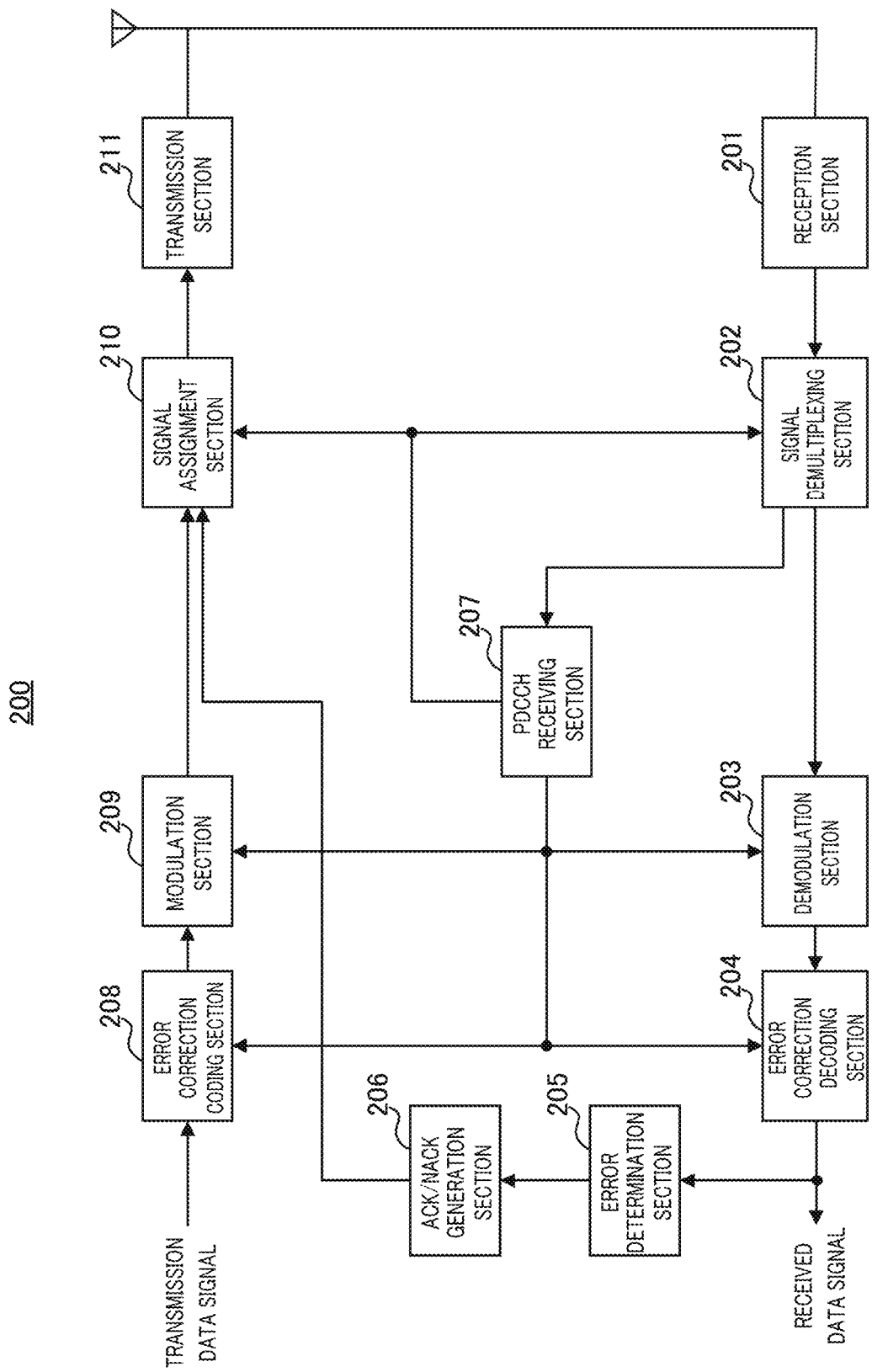
FIG. 6 is a block diagram illustrating a configuration of the terminal according to Embodiment 1.

FIG. 6 is a block diagram illustrating a configuration of terminal 200 according to Embodiment 1. In FIG. 6, terminal 200 includes reception section 201, signal demultiplexing section 202, demodulation section 203, error correction decoding section 204, error determination section 205, ACK/NACK generation section 206, PDCCH receiving section 207, error correction coding section 208, modulation section 209, signal assignment section 210, and transmission section 211.

Reception section 201 receives a received signal via an antenna, applies reception processing such as down-conversion to the received signal, and then outputs the processed received signal to signal demultiplexing section 202.

Signal demultiplexing section 202 demultiplexes the signal mapped to a resource having a possibility of being a resource to which PDCCH or EPDCCH is assigned (PDCCH signal or EPDCCH signal), and outputs the demultiplexed signal to PDCCH receiving section 207. Signal demultiplexing section 202 demultiplexes a DL data signal from the received signal based on the DL resource allocation information received from PDCCH receiving section 207 and outputs the DL data signal to demodulation section 203. When a resource for a plurality of TTIs is allocated on PDCCH or EPDCCH, signal demultiplexing section 202 outputs the DL data signal assigned to the same resource to demodulation section 203 in the plurality of TTIs to which the resource is allocated.

Demodulation section 203 demodulates the signal received from signal demultiplexing section 202, based on the DL MCS information (modulation information) received from PDCCH receiving section 207, and outputs the demodulated signal to error correction decoding section 204.

Error correction decoding section 204 decodes the demodulated signal received from demodulation section 203, based on the DL MCS information (error coding information), NDI, HARQ number, and redundancy version received from PDCCH receiving section 207, and outputs the resultant received data. The received data signal is outputted to error determination section 205.

Error determination section 205 detects an error using CRC in the received data signal and outputs the result of detection to ACK/NACK generation section 206.

ACK/NACK generation section 206 generates an ACK when there is no error or generates a NACK when there is an error, based on the result of detection on the received data signal, which is received from error determination section 205, and outputs the generated ACK/NACK signal to signal assignment section 210.

PDCCH receiving section 207 receives a PDCCH signal or EPDCCH signal (i.e., DCI) received from signal demultiplexing section 202, and when a plurality of TTIs is assigned in this DCI, PDCCH receiving section 207 extracts an NDI for each of the TTIs. PDCCH receiving section 207 also extracts the information on the HARQ number and redundancy version for each of the TTIs to which a DL data resource is allocated. Moreover, PDCCH receiving section 207 extracts resource allocation information (DL resource allocation information and UL resource allocation information) and MCS information as information common among the plurality of TTIs and outputs the DL resource allocation information to signal demultiplexing section 202, outputs the UL resource allocation information to signal assignment section 210, outputs modulation information in the MCS information to demodulation section 203 and modulation section 209, and outputs the error correction information in the MCS information and the NDI to error correction coding section 204 and error correction decoding section 208. PDCCH receiving section 207 also outputs the HARQ number and redundancy version of the DL data to error correction coding section 208.

Error correction coding section 208 determines whether the transmission data signal (UL data signal) is treated as a new assignment or retransmission based on the NDI received from PDCCH receiving section 207. Error correction coding section 208 also applies error correction coding to the UL data signal based on the MCS information (error coding information) received from PDCCH receiving section 207 and outputs the coded data signal to modulation section 209.

Modulation section 209 modulates the data signal received from error correction coding section 208, based on the MCS information (modulation information) received from PDCCH receiving section 207, and outputs the modulated data signal to signal assignment section 210.

Signal assignment section 210 assigns the data signal received from modulation section 209 to a resource based on the UL resource allocation information received from PDCCH receiving section 207, and outputs the resultant data signal to transmission section 211. Signal assignment section 210 assigns the ACK/NACK signal received from ACK/NACK generation section 206 to a PUCCH resource or multiplexes the ACK/NACK information on the UL data signal, and outputs the signal to transmission section 211.

Transmission section 211 applies transmission processing such as up-conversion to the signal received from signal assignment section 210 and transmits the processed signal via an antenna.

[Operations of Base Station 100 and Terminal 200]

A description will be given of operations of base station 100 and terminal 200 each configured in the manner described above, with reference to the drawings.

In Embodiment 1, when latency reduction is performed, base station 100 allocates a resource to a plurality of TTIs using single DCI. In this case, base station 100 includes a bit sequence indicating the presence or absence of the assignment (resource allocation) for each of the plurality of TTIs in this single DCI and notifies terminal 200 of the resource allocation.

In a case where the frequency of CQI reporting increases because of the shortening of the TTI length due to latency reduction, thus resulting in reducing delay in CQI reporting after CQI measurement, there is an advantageous for the base station in that the resource allocation and the MCS can be configured after the quality close to the actual channel quality is predicted. However, in a case where the frequency of CQI reporting is limited to a predetermined period such as every ten TTIs or five TTIs, the base station predicts channel quality using the same CQI report and configures the resource allocation and the MCS during the period until the CQI is updated. Accordingly, under the limitation, even when the same frequency resource allocation and MCS are configured for the plurality of TTIs, the influence on throughput reduction is expected to be small.

In addition, an improvement in outer loop control followability can be predicted when shortening the TTI length increases the number of times ACK/NACK signals are transmitted and received. The outer loop control is to control a base station to select an MCS that achieves a target error rate, in accordance with the decoding determination result (ACK/NACK signal) for a packet, which is reported by the UE. Accordingly, shortening the TTI length to increase the number of ACK/NACK signals per resource allocated to each of the plurality of TTIs is considered effective in throughput improvement.

In consideration of the two points mentioned above, shortening the TTI length is effective in throughput improvement because of reducing delay in CQI reporting and an increase in the number of ACK/NACK signals, but changing the resource allocation and MCS configuration for each TTI is considered unnecessary.

In this respect, base station 100 configures transmission and reception processing for ACK/NACK signals, i.e., configures, in a single DCI, control information on retransmission processing (HARQ processing) for each plurality of TTIs. Meanwhile, base station 100 configures, in a single DCI, control information other than the control information on retransmission processing, such as a frequency resource (physical resource block (PRB)) and MCS, for example, in common among the plurality of TTIs (to be shared among the plurality of TTIs).

Accordingly, even when base station 100 allocates a resource to a plurality of TTIs in latency reduction, an increase in control information to be contained in a single DCI can be avoided, and the overhead amount of a DCI can be reduced. In addition, indicating the control information for a plurality of TTIs using a single DCI reduces the number of times DCIs are detected at terminal 200, so that the probability of DCI detection error can be reduced.

Hereinafter, a description will be given of Operation Examples 1 and 2 according to Embodiment 1.

Operation Example 1: DL

In Operation Example 1, base station 100 (PDCCH generation section 103) newly adds TTI information (resource allocation) indicating whether assignment is performed by a DCI for each TTI, in order to indicate resource allocation for a plurality of TTIs within a single DL subframe, as control information to be indicated using a single DCI.

For example, base station 100 adds a bit sequence for the number of TTIs simultaneously assignable to a single DCI, as the TTI information. Each bit of the bit sequence corresponds to one of the plurality of TTIs simultaneously assignable to a single DCI. For example, when a certain bit of the bit sequence is "1," this means that the allocation is present for the corresponding one of the TTIs, and when a certain bit of the bit sequence is "0," this means that this is no allocation for the corresponding TTI. Terminal 200 identifies the presence or absence of allocation for each TTI based on the TTI information contained in a single DCI.

In addition, base station 100 configures information sharable among a plurality of TTIs within control information contained in the traditional DCI to be in common among the plurality of TTIs, and individually configures information that needs to be individually indicated to each TTI. Base station 100 transmits all these pieces of information using a single DCI.

In LTE/LTE-Advanced, for example, the DCI format to be used varies depending on the transmission mode, and the information contained in the DCI varies depending on the DCI format. FIG. 7 illustrates examples of control information configured in common among a plurality of TTIs indicated using a single DCI (common), and control information configured for each TTI in this operation example.

In this operation example, however, format 1C is excluded. This is because format 1C is used for assignments of broadcast control channel (BCCH), paging control channel (PCCH), and random access control channel (RACH) response, and is used for very compact scheduling of one PDSCH codeword to be monitored by common search space (CSS) only, so that it is expected that latency reduction is not applied to BCCH, PCCH, or RACH. Accordingly, even when "DCI format" is "ALL" in FIG. 7, DCI format 1C is not included.

Moreover, the control information for UL that is contained in a DL assignment DCI is set to be one per UL, and it is indicated as "One value for UL."

As illustrated in FIG. 7, in this operation example, "HARQ process number (HARQ number)," "New data indicator (NDI)," "Redundancy version (RV)," and "Transport block to codeword swap flag" which is contained in DCI format 2/2A are configured for each of a plurality of TTIs, and other control information on DL assignments is configured in common among a plurality of TTIs.

Note that, "Transport block to codeword swap flag" is a parameter indicating the relationship between a codeword and transport block (data). For example, when two transport blocks are present, bit "0" indicates a combination of transport block 1 and codeword 0, and transport block 2 and codeword 1, while bit "1" indicates a combination of transport block 1 and codeword 1, and transport block 2 and codeword 2, which is opposite to the combination indicated by bit "0" in "Transport block to codeword swap flag." The reception quality among the transport blocks can be averaged by changing the combination of a transport block and codeword for retransmission, using "transport block to codeword swap flag."

More specifically, the HARQ process number, NDI, RV, and transport block to codeword swap flag are control information on retransmission processing for DL data signals.

As described above, base station 100 performs assignment for a plurality of TTIs using a single DCI. In the assignment, base station 100 configures control information on retransmission processing for each plurality of TTIs, but configures other control information (such as resource allocation and MCS) in common among the plurality of TTIs. Since base station 100 performs assignment for a plurality of TTI using a single DCI, the proportion of control information (DCI) in the resources can be reduced as compared with a case where DCIs are transmitted for individual TTIs, respectively.

In addition, allocating the same frequency resource to a plurality of TTIs is advantageous in that the DL reference signal (RS) can be shared.

Figure 8:
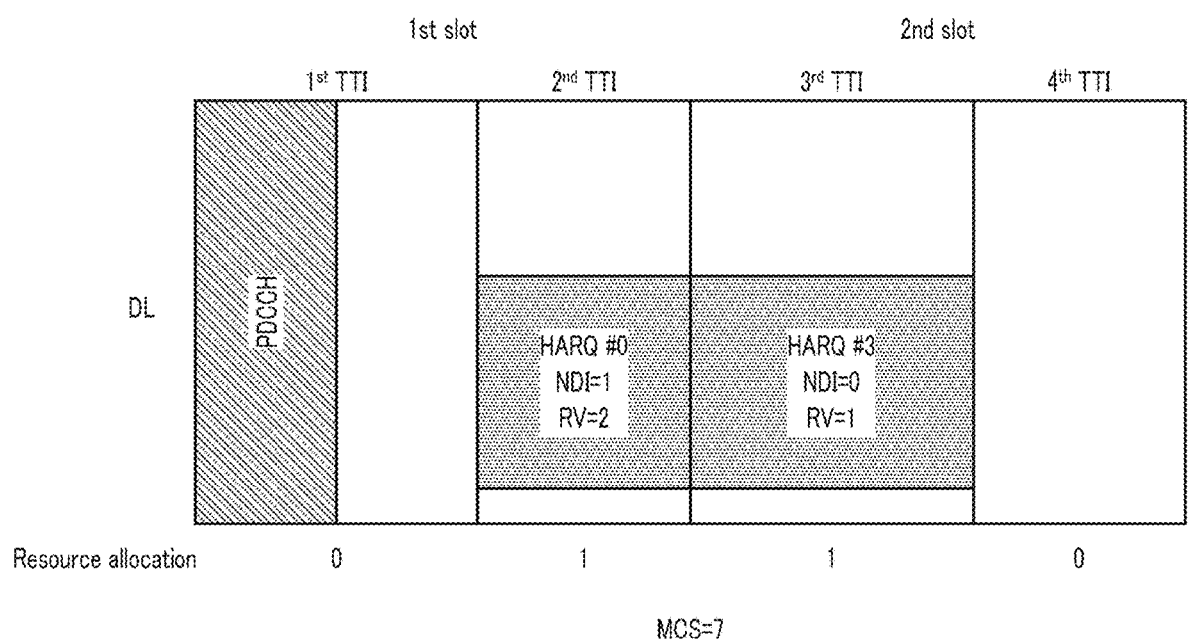
FIG. 8 is a diagram illustrating an example of DL assignments according to Embodiment 1.

FIG. 8 illustrates an example of DL assignments. In FIG. 8, the number of TTIs per subframe is four, and the number of TTIs simultaneously assignable to a single DCI is four.

In FIG. 8, resource allocation indicating the presence or absence of resource allocation for each TTI indicates (0, 1, 1, 0), and this means that resources are allocated to the $2^{nd}$ and $3^{rd}$ TTIs, and no resource is allocated to the $1^{st}$ or $4^{th}$ TTI.

As illustrated in FIG. 8, base station 100 indicates to terminal 200, a common frequency resource to the TTIs for which DCI assignments are present in frequency domain, while indicating the HARQ number (HARQ process number), NDI, and RV to each TTI.

Moreover, as a reference signal used for demodulation of DL data, either a cell specific reference signal (CRS) or a demodulation reference signal (DMRS) is used in DL. With a CRS, terminal 200 can demodulate data using a CRS mapped within one subframe or one slot, regardless of whether a resource is allocated for the TTI.

Meanwhile, with a DMRS, the following two methods are possible as the modulation method in terminal 200.

The first method is for terminal 200 to demodulate data using only a DMRS mapped in a TTI to which a resource is allocated. In this case, base station 100 needs to always include a TTI in which a DMRS is mapped when assigning a plurality of TTIs. In this method, the resource amount for a DMRS used in terminal 200 becomes less, which is advantageous in that a resource for another UE is easily allocated for another TTI.

The second method is for terminal 200 to demodulate data using a DMRS within one subframe or one slot, regardless of whether the TTI is allocated a resource. In this method, regardless of which TTI is allocated a resource by base station 100 when base station 100 assigns a plurality of TTIs, the DMRS usable in terminal 200 is the same, so that base station 100 can ensure the demodulation accuracy in terminal 200. However, it is necessary to limit the DMRS antenna port useable when a plurality of terminals 200 is assigned to different TTIs or to limit assignments for a TTI to be terminal 200 that can use a DMRS in common.

Operation Example 2: UL

In Operation Example 2, as in the case of DL, base station 100 (PDCCH generation section 103) newly adds TTI information (resource allocation) indicating whether assignment is performed using a DCI for each TTI, in order to indicate a resource for a plurality of TTIs within a single UL subframe, as control information to be indicated using a single DCI.

For example, as in the case of DL, base station 100 adds a bit sequence for the number of TTIs simultaneously assignable to a single DCI, as the TTI information. Each bit of the bit sequence corresponds to one of the plurality of TTIs simultaneously assignable to a single DCI. For example, when a certain bit of the bit sequence is "1," this means that allocation for the corresponding TTI is present, while "0" means that this is no allocation for the corresponding TTI. Terminal 200 identifies the presence or absence of allocation for each TTI based on the TTI information contained in a single DCI.

FIG. 9 illustrates an example of control information to be configured in common among a plurality of TTIs indicated by one DCI (common) and control information configured for individual TTIs (each TTI). Note that, there are two kinds of DCI formats indicating UL data assignments: DCI format 0 and DCI format 4, and FIG. 9 illustrates an example when there are two kinds of DCI formats.

In UL assignments, unlike DL, the HARQ process number or redundancy version (RV) is not indicated, and the HARQ process number and redundancy version (RV) change in accordance with a predetermined rule between base station 100 and terminal 200. Accordingly, in UL assignments, only new data indicators (NDIs) are respectively transmitted to a plurality of TTIs, and other control information on UL assignments is transmitted in common to the plurality of TTIs. More specifically, the control information on retransmission processing for the UL data signal is the NDI.

As described, base station 100 performs assignment for a plurality of TTIs using a single DCI. In this assignment, base station 100 configures the control signal on retransmission processing (NDI) to each of the plurality of TTIs, but other control information (e.g., resource allocation and MCS or the like) are configured in common among the plurality of TTIs. The assignment for a plurality of TTIs using a single DCI by base station 100 can reduce the proportion of control information (DCI) in the resources as compared with the case where DCIs are transmitted respectively to TTIs.

In addition, allocating the same frequency resource to a plurality of TTIs is advantageous in that the UL reference signal (RS) can be shared. In particular, the RS needs to be transmitted to each terminal 200 in UL, so that sharing of the RS among a plurality of TTIs brings about effects in reducing the number of RSs and improving the channel quality measurement accuracy.

Furthermore, UEs transmit a retransmission signal using the TTI having the same HARQ number in UL. However, since the DCI does not include indication of the HARQ number, TTIs corresponding to signals of the same HARQ number are sequentially determined in accordance with a predetermined rule. For example, the HARQ number is 8 in the traditional FDD to which no latency reduction is applied. Accordingly, the same HARQ number is set every eighth TTI, so that the UE can retransmit the signal in every eighth TTI.

There are two retransmission methods called "adaptive retransmission" and "non-adaptive retransmission" in UL.

The adaptive retransmission is a retransmission method in which the base station indicates retransmission to the UE using a DCI (NDI) to newly indicate the resource allocation, MCS, and the like using the DCI for every retransmission.

In assignment other than semi persistent scheduling (SPS), the UE determines whether it is a retransmission or a new data assignment in accordance with the value of the NDI. More specifically, when the NDI indicated by a DCI with a certain HARQ number and the NDI contained in a DCI indicating the last UL data signal with the same HARQ number are the same (Non toggle), the UE determines that it is retransmission, and when the NDI is different from the last NDI (toggle), the UE determines that it is a new data assignment. In adaptive retransmission, retransmission can be indicated until new data is assigned with the same HARQ number, and it is also possible not to indicate retransmission at eighth TTI but indicate retransmission at sixteenth TTI.

The non-adaptive retransmission is a retransmission method in which the base station indicates retransmission to the UE using only an ACK/NACK signal indicated on physical HARQ indicator channel (PHICH) and transmits no DCI. In the non-adaptive retransmission, the UE determines the presence or absence of retransmission in accordance with PHICH. More specifically, in FDD, when notified of a NACK on PHICH by the base station in DL after four TTIs from transmission of the UL data signal, the UE transmits a retransmission signal using the same frequency resource and MCS as those of the last transmission in a TTI having the same HARQ number after another four TTIs. Meanwhile, when the UE is notified of an ACK on PHICH and detects no DCI, the UE does not transmit the UL data signal with the applicable HARQ number but prepares for adaptive retransmission while saving the last transmitted signal in the buffer.

In this operation example, a description will be given of cases where non-adaptive retransmission and adaptive retransmission are both supported and where only adaptive retransmission is supported when a plurality of TTIs are assigned in latency reduction.

[With Non-Adaptive Retransmission and Adaptive Retransmission Support]

Figure 10A:
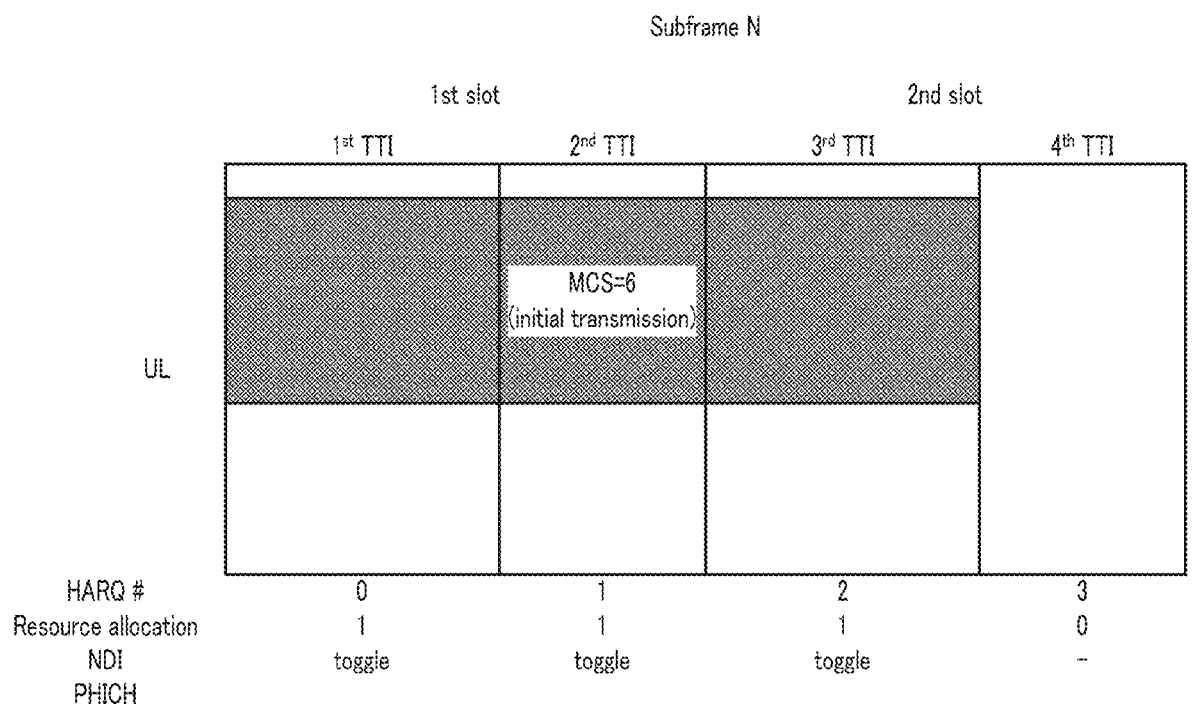
FIG. 10A is a diagram illustrating an example of assignments in UL subframe N in a case where non-adaptive retransmission and adaptive retransmission according to Embodiment 1 are supported.
Figure 10B:
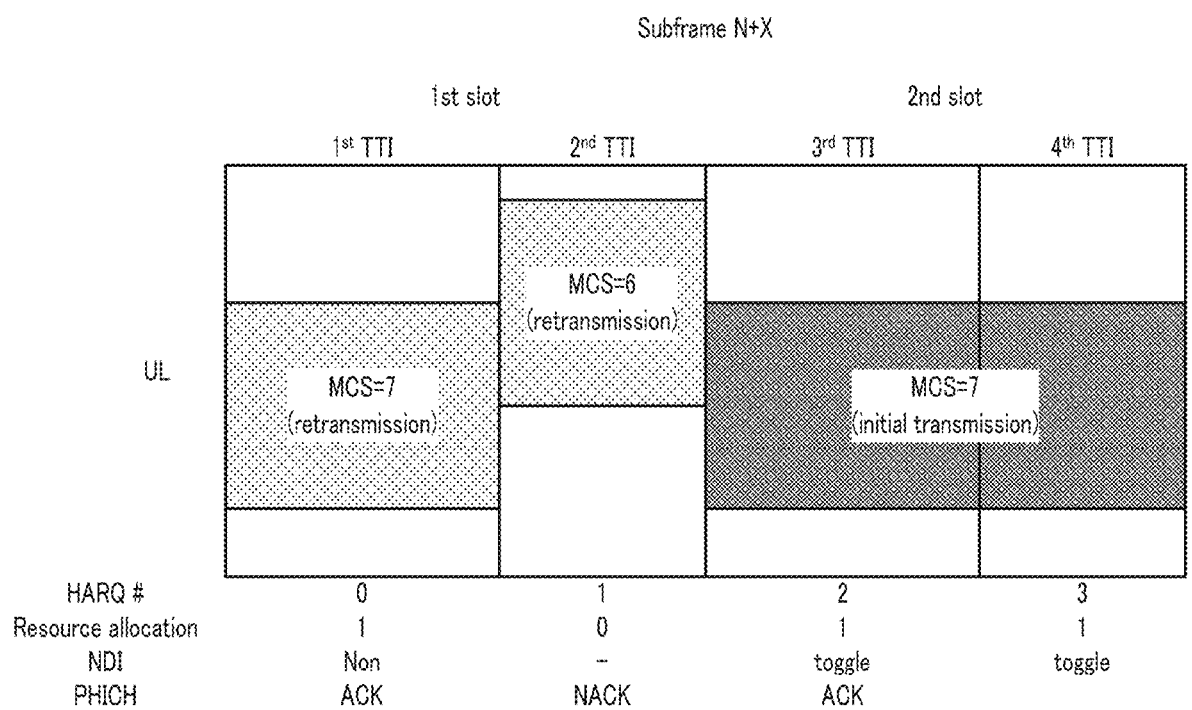
FIG. 10B is a diagram illustrating an example of assignments in UL subframe N+X in a case where non-adaptive retransmission and adaptive retransmission according to Embodiment 1 are supported.

FIGS. 10A and 10B illustrate an example in which the non-adaptive retransmission and adaptive retransmission are both supported. In FIGS. 10A and 10B, the number of TTIs per subframe is four, and the number of TTIs simultaneously assignable to a single DCI is four. In addition, in FIGS. 10A and 10B, the HARQ numbers are sequentially assigned to the respective TTIs, and it is prescribed that the same HARQ number is assigned after X subframes.

In subframe N illustrated in FIG. 10A, resource allocation indicating resource allocation for TTIs is (1, 1, 1, 0), and new data is assigned to the $1^{st}$, $2^{nd}$ and $3^{rd}$ TTIs and no data is assigned to the $4^{th}$ TTI. The frequency resource allocation (PRB) and MCS (MCS=6) are configured in common among TTIs for the new data assigned to the TTIs, and the NDI is configured for each TTI. In FIG. 10A, all the NDIs for the $1^{st}$, $2^{nd}$, and $3^{rd}$ TTIs are toggle (new data assignment).

In subframe N+X after X subframes (i.e., the subframe in which the HARQ number is the same as that of subframe N) in FIG. 10B, HARQ #0 and HARQ #1 are adaptive retransmission and non-adaptive retransmission, respectively, and HARQ #2 and HARQ #3 are a new data assignment.

In this case, resource allocation is (1, 0, 1, 1) as illustrated in FIG. 10B.

More specifically, in the resource allocation illustrated in FIG. 10B, assignment for the $1^{st}$, $3^{rd}$ and $4^{th}$ TTIs corresponding to HARQ numbers #0, #2, and #3 for new data assignment, and adaptive retransmission are present (1). In addition, in FIG. 10B, the NDI for the $1^{st}$ TTI with HARQ #0 is non-toggle and indicates assignment of retransmission data, and the NDIs for the $3^{rd}$ TTI with HARQ #1 and $4^{th}$ TTI with HARQ #2 are toggle, and indicate a new data assignment. Note that, the same frequency resource is allocated for the $1^{st}$, $3^{rd}$, and $4^{th}$ TTIs with HARQ #0, #2, and #3, which are assigned using a single DCI, and the same MCS (MCS=7) is also configured for these TTIs.

Meanwhile, in subframe N+X, there is no assignment for the $2^{nd}$ TTI corresponding to HARQ number #1 for non-adaptive retransmission (0). More specifically, the DCI indicated by base station 100 does not contain an assignment for the $2^{nd}$ TTI in which non-adaptive retransmission is performed. In FIG. 10B, PHICH for the $2^{nd}$ TTI with HARQ #1 is a NACK. Accordingly, in non-adaptive retransmission, terminal 200 performs retransmission using the same frequency resource and MCS (MCS=6) as those used in subframe N.

As described above, base station 100 transmits PHICH containing an ACK/NACK signal for the UL data signal assigned in the TTI in which non-adaptive retransmission is performed, and transmits the DCI containing the NDI for the UL data signal assigned in the TTI in which adaptive retransmission is performed among a plurality of TTIs. More specifically, base station 100 does not include, in the DCI, assignment for the TTI in which non-adaptive retransmission is performed. Moreover, terminal 200 performs retransmission processing based on PHICH in the TTI in which non-adaptive retransmission is performed, and performs retransmission processing based on the NDI in the TTI in which adaptive retransmission is performed.

As described above, since assignment for TTIs using a single DCI is not performed in non-adaptive retransmission, no DCI is transmitted when there is no new UL data assignment or adaptive retransmission data in the other TTIs in the subframe containing the TTI in which non-adaptive retransmission is performed. Thus, the overhead for the control signal can be reduced advantageously when there is no assignment using a DCI.

[With Only Adaptive Retransmission Support]

Figure 11A:
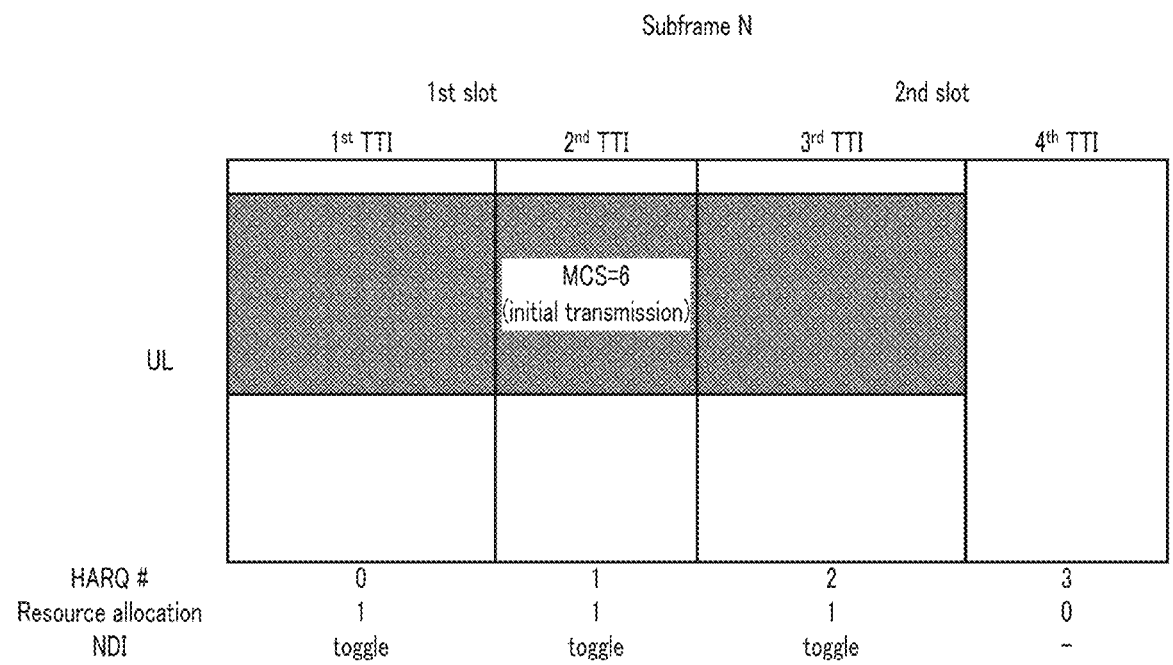
FIG. 11A is a diagram illustrating an example of assignments in UL subframe N in a case where adaptive retransmission according to Embodiment 1 is supported.
Figure 11B:
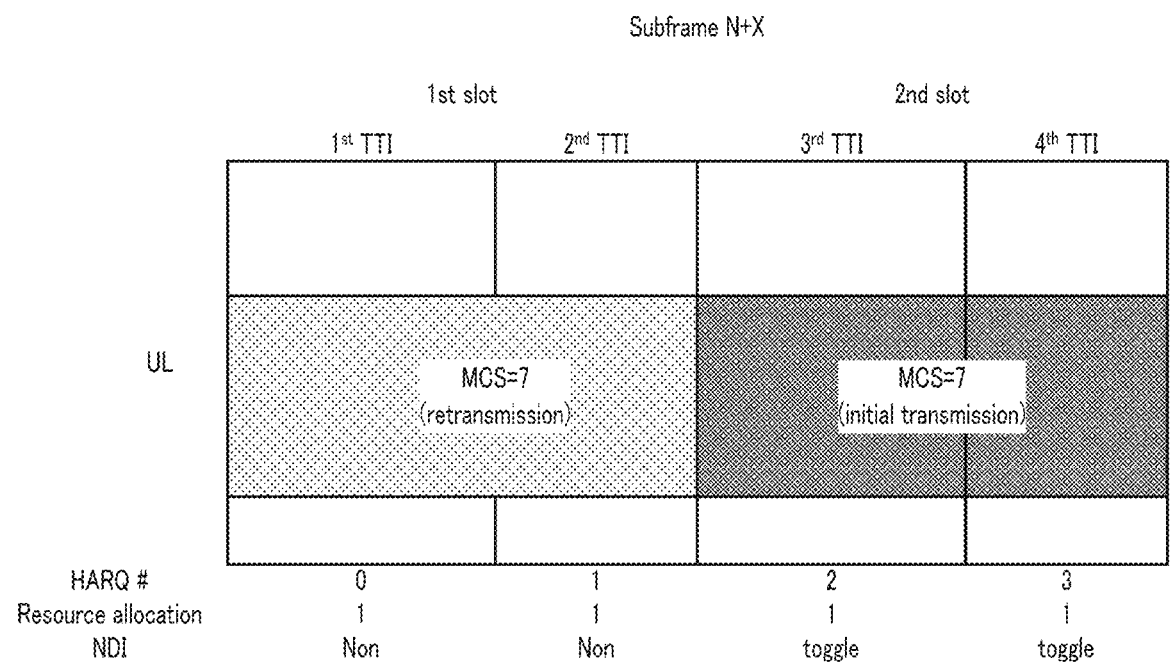
FIG. 11B is a diagram illustrating an example of assignments in UL subframe N+X in a case where adaptive retransmission according to Embodiment 1 is supported.

FIGS. 11A and 11B illustrate an example in which only adaptive retransmission is supported. In FIGS. 11A and 11B, the number of TTIs per subframe is four, and the number of TTIs simultaneously assignable to a single DCI is four. In addition, in FIGS. 11A and 11B, the HARQ numbers are sequentially assigned to the respective TTIs, and it is prescribed that the same HARQ number is assigned after X subframes.

In subframe N illustrated in FIG. 11A, resource allocation indicating resource allocation for TTIs is (1, 1, 1, 0), and new data is assigned to the $1^{st}$, $2^{nd}$ and $3^{rd}$ TTIs and no data is assigned to the $4^{th}$ TTI as illustrated in FIG. 10A.

In subframe N+X after X subframes (i.e., the subframe in which the HARQ number is the same as that of subframe N) in FIG. 11B, HARQ #0 and HARQ #1 are adaptive retransmission and HARQ #2 and HARQ #3 are a new data assignment.

In this case, resource allocation is (1, 1, 1, 1) as illustrated in FIG. 11B.

More specifically, in the resource allocation illustrated in FIG. 11B, assignments for the $1^{st}$, $2^{nd}$, $3^{rd}$ and $4^{th}$ TTIs corresponding to HARQ numbers #0, #1, #2, and #3 for new data assignment, and adaptive retransmission are present (1). In addition, in FIG. 11B, the NDIs for the $1^{st}$ TTI with HARQ #0 and the $2^{nd}$ TTI with HARQ #1 are non-toggle and indicate the assignment of retransmission data, and the NDIs for the $3^{rd}$ TTI with HARQ #2 and $4^{th}$ TTI with HARQ #3 are toggle, and indicate a new data assignment. Note that, the same frequency resource is allocated for the $1^{st}$, $2^{nd}$, $3^{rd}$ and $4^{th}$ TTIs with HARQ #0, #1, #2, and #3, which are assigned using a single DCI, and the same MCS (MCS=7) is also configured for these TTIs.

As described above, base station 100 transmits the DCI containing the NDIs for the UL data signal assigned in a plurality of TTIs in which adaptive retransmission is performed, but transmits no PHICH. Thus, the PHICH resource becomes advantageously unnecessary when only adaptive retransmission is supported. Note that, when there is adaptive retransmission or a new data assignment in even one of TTIs in a single subframe, base station 100 transmits a DCI in the subframe, but PHICH is unnecessary because the assignment for retransmission data can be indicated using the same DCI. More specifically, the system that supports only adaptive retransmission eliminating the need for PHICH is effective in overhead reduction.

Moreover, when only adaptive retransmission is supported, the frequency allocation and MCS are common among the TTIs within one subframe. The use of common frequency resource is advantageous in that the reference signal can be shared among the TTIs and in that a collision with data assignment for another UE occurs less likely. In particular, the data assignment for the traditional UEs is performed in units of subframe or slot, so that use of the same frequency resource within a subframe or slot is advantageous in that a collision occurs less likely in data resource allocation for the traditional UEs.

In UL, when resources cannot be allocated to all the TTIs in one subframe, terminal 200 may transmit only a reference signal mapped in the TTI allocated a resource. In this case, when a signal directed to another UE is assigned to another TTI, the reference signal can be transmitted in each UE.

Operation Examples 1 and 2 have been described thus far.

As described above, in Embodiment 1, base station 100 generates a single DCI containing control information for a plurality of shortened TTIs and transmits the DCI to terminal 200. In the DCI, control information on retransmission processing for a DL/UL data signal is configured for each of the plurality of shortened TTIs, and control information other than the control information on retransmission processing is assigned in common among the plurality of shortened TTIs.

Latency reduction is applied in this manner, so that even when shortened TTIs are used, an increase in the proportion of DCIs in the entire resources can be suppressed. Thus, according to Embodiment 1, an efficient use of resources is enabled even when the TTI length is shortened.

Moreover, in Embodiment 1, when the TTI length is shortened, resource allocation for TTIs placed in one subframe is contained in a single DCI. Thus, the TTIs contained in the same subframe can share the same reference signal. As a result, since the reference signal does not have to be mapped in each TTI, it is made possible to prevent a reduction in resources that can be allocated to data, thus preventing the throughput reduction. Moreover, indication of TTI assignments using a DCI in units of subframe in latency reduction makes it easier to perform scheduling with a UE to which no latency reduction is applied (i.e., UE for which a resource is allocated in units of subframe).

According to Embodiment 1, the DCI contains information indicating the presence or absence of an assignment for each of a plurality of shortened TTIs (resource allocation). Thus, terminal 200 can identify the presence or absence of assignments for a plurality of shortened TTIs when successfully receiving the DCI. For example, when a plurality of TTIs is indicated using the respective DCIs, the UE may encounter a situation where the UE fails to detect the DCIs (misdetection) although the base station has transmitted the DCIs. In Embodiment 1, such misdetection can be avoided.

Note that, although the HARQ numbers are illustrated in Embodiment 1, the HARQ numbers are counted in each of base station 100 and terminal 200, so that the HARQ numbers may not be common values. Moreover, the number of HARQ numbers is prescribed, so that base station 100 and terminal 200 recognize that the HARQ process is identical between base station 100 and terminal 200 by cyclically counting up HARQ numbers for each TTI in base station 100 and terminal 200.

In Embodiment 1, an assumption is made that base station 100 and terminal 200 use the same HARQ process, and the HARQ number is not indicated using a DCI in UL. However, the HARQ number may be indicated using a DCI in UL as in the case of DL. In this case, the HARQ numbers are configured respectively for a plurality of TTIs in a DCI in UL as in the case of DL.

Moreover, although a description has been given of the case where a plurality of TTIs assignable using a single DCI is TTIs within one subframe, the plurality of TTIs assignable using a single DCI may be TTIs within one slot or a predetermined number of TTIs. The advantage obtained by assigning a plurality of TTIs mentioned above can be obtained as TTIs within one slot or a predetermined number of TTIs.

The DCI used for assigning a plurality of TTIs is mapped to PDCCH only and may not be mapped to EPDCCH. PDCCH is mapped to the top of a subframe, so that the time required for terminal 200 to complete reception of the DCI can be shorter, but EPDCCH has a characteristic that the time required for terminal 200 to complete reception of the DCI is longer because EPDCCH is mapped to the last OFDM symbol in a subframe. For this reason, mapping the DCI on PDCCH by base station 100 allows terminal 200 to complete reception of the DCI promptly, which is advantageous in that terminal 200 can ensure the time for preparing feedback of an ACK/NACK signal for the DL data, or transmission of the UL data signal.

Alternatively, the DCI used for assigning a plurality of TTIs may be mapped to only EPDCCH and may not be mapped to PDCCH. Since PDCCH is mapped to the top of a subframe, the resource amount is limited. The DCI indicating a plurality of TTIs has a characteristic that the amount of information is large and the code length is long as compared with the DCI indicating only a single TTI. However, EPDCCH has a characteristic that the resource amount can be increased in the frequency domain, so that the resource amount is easily adjustable as compared with PDCCH. Thus, mapping the DCI used for assigning a plurality of TTIs on only EPDCCH allows base station 100 to prevent running out of PDCCH resources.

In addition, although the resource where a DCI is mapped is configured to be PDCCH or EPDCCH, it is also possible to set a new PDCCH to be newly configured for latency reduction.

Embodiment 2

In Embodiment 2, a description will be given of a transmission method of an ACK/NACK signal for a DL data signal assigned in a plurality of TTIs within one subframe in a case where latency reduction is applied.

The base station and terminal according to Embodiment 2 have a basic configuration common to base station 100 and terminal 200 according to Embodiment 1, and are thus described with reference to FIGS. 5 and 6.

When DL a data signal in a plurality of TTIs is assigned, an ACK/NACK signal for the DL data signal is generated in each TTI. Moreover, the ACK/NACK signal is configured for each codeword, so that one or two ACK/NACK signals are generated per TTI when a DL data signal is assigned.

An assumption is made that base station 100 notifies terminal 200 of assignments of a plurality of TTIs using a single DCI as described in Embodiment 1. In this case, the PUCCH resource used in transmission of an ACK/NACK signal is expected to be determined implicitly in association with a control channel element (CCE) number of PDCCH or an enhanced CCE (ECCE) of EPDCCH used for transmission of the DCI. This configuration is advantageous in that, it is not necessary to newly indicate a PUCCH resource location even when latency reduction is used.

[Description of PUCCH Resources]

The format of PUCCH resources used in transmission of an ACK/NACK signal varies depending on the number of bits of the ACK/NACK signal.

When the ACK/NACK signal consists of one bit, PUCCH format 1a is used, and when the ACK/NACK signal consists of two bits, PUCCH format 1b is used. Moreover, when the ACK/NACK signal consists of three bits or more, the number of bits is reduced by bundling/multiplexing or channel section, and PUCCH format 1a/1b, or PUCCH format 3 is used. Note that, PUCCH format 3 is used when the higher layer indicates use of PUCCH format 3.

In addition, frequency hopping is applied to transmission of PUCCH, and PUCCH is transmitted using a frequency (PRB) different between the $1^{st}$ and $2^{nd}$ slots of UL.

Figure 12A:
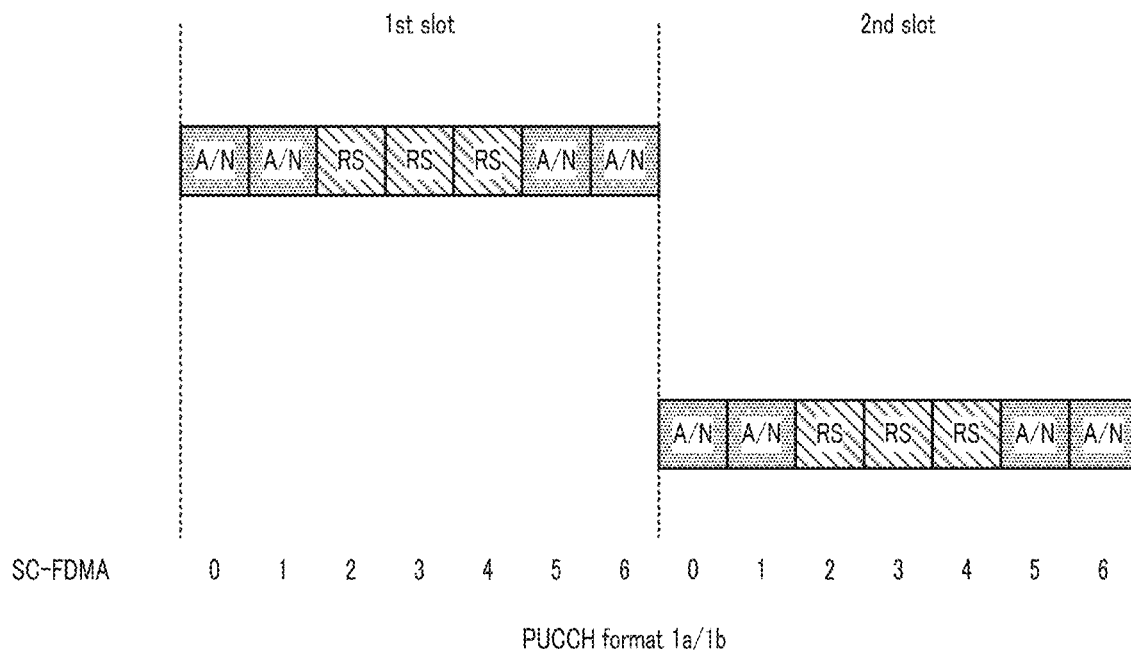
FIG. 12A is a diagram illustrating the concept of PUCCH resources.
Figure 12B:
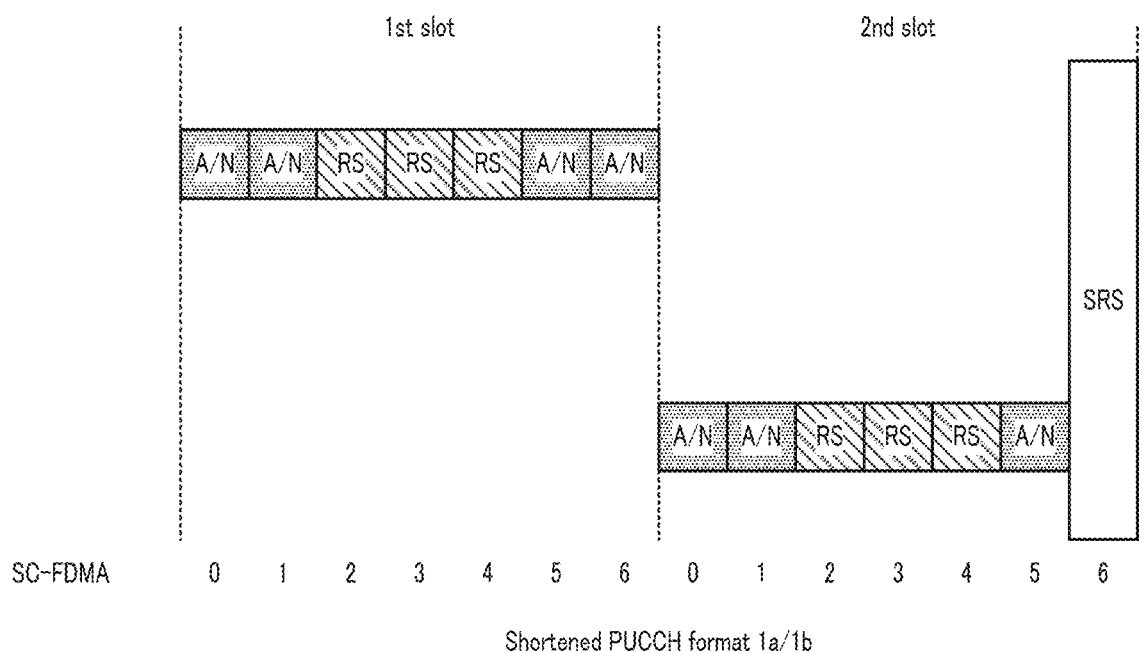
FIG. 12B is a diagram illustrating the concept of PUCCH resources in a case where an SRS is mapped.

FIGS. 12A and 12B illustrate a conceptual diagram of PUCCH resources in PUCCH format 1a/1b.

As illustrated in FIGS. 12A and 12B, for normal CP, ACK/NACK signals are mapped to SC-FDMA symbols #0, #1, #5, and #6 in each slot while reference signals (RSs) are mapped to SC-FDMA symbols #2, #3, and #4 in each slot in PUCCH format 1a/1b. The ACK/NACK signals are coded using length-4 orthogonal sequences, and the reference signals are coded using length-3 orthogonal sequences. However, as illustrated in FIG. 12B, when an SRS is mapped to the last OFDM symbol of the $2^{nd}$ slot, the ACK/NACK signals are coded also using length-3 orthogonal sequences.

PUCCH format 3 is a format capable of transmitting a plurality of ACK/NACK bits simultaneously, and capable of transmitting up to 48 bits. For normal CP, the reference signals are mapped to SC-FDMA symbols #1 and #5 in each slot, and for extended CP, the reference signal is mapped to SC-FDMA symbol #3 in each slot (see, e.g., NPL 2).

Hereinafter, a description will be given of Operation Examples 1 and 2 according to Embodiment 2.

Operation Example 1

In Operation Example 1, terminal 200 (signal assignment section 210) configures mapping of an ACK/NACK signal generated in each TTI to be in common with mapping of an ACK/NACK signal and a reference signal of the traditional PUCCH format 1a/1b.

However, terminal 200 limits the position where an ACK/NACK signal is mapped in each TTI. For example, terminal 200 assigns an ACK/NACK signal for DL data in order of DL assignments in TTIs in UL. More specifically, an ACK/NACK signal for a DL data signal transmitted in an earlier time TTI among a plurality of TTIs is mapped to an earlier time resource among PUCCH resources. Thus, base station 100 can reduce the delay amount of an ACK/NACK signal in reception of ACK/NACK signals for DL data signals transmitted in the plurality of TTIs.

In Operation Example 1, TTIs used for transmission in the same slot share a reference signal mapped in this slot.

<For Two TTIs Per Subframe>

Terminal 200 transmits an ACK/NACK signal for a DL data signal assigned in the $1^{st}$ slot in DL, using only the $1^{st}$ slot of PUCCH resources in UL as well and also transmits an ACK/NACK signal for a DL data signal assigned in the $2^{nd}$ slot in DL, using only the $2^{nd}$ slot of PUCCH resources in UL as well.

In this case, terminal 200 uses the same orthogonal sequences as the traditional PUCCH for ACK/NACK signals.

In this case, although a frequency hopping gain is no longer obtained in PUCCH resources of terminal 200 to which latency reduction is applied, coding is performed using the same orthogonal sequences as those of the traditional UEs, so that simultaneous assignment is advantageously made possible while orthogonality with the traditional PUCCH resources is maintained.

<For Four TTIs Per Subframe>

FIG. 13 illustrates allocation of PUCCH resources (SC-FDMA symbols) for transmitting ACK/NACK signals for DL data signals assigned in TTIs within a DL subframe in the case of four TTIs per subframe.

As illustrated in FIG. 13, an ACK/NACK signal for the $1^{st}$ and the $2^{nd}$ TTIs is shared between the TTIs in the $1^{st}$ slot of UL, and an ACK/NACK signal for the $3^{rd}$ and the $4^{th}$ TTIs is shared between the TTIs in the $2^{nd}$ slot of UL. Moreover, as illustrated in FIG. 13, the number of SC-FDMA symbols for transmitting the ACK/NACK signals for each of the TTIs is two, so that the code length of the orthogonal sequences is two. For example, sequence index #0 is set to code [+1, +1] and sequence index #1 is set to code [+1, −1]. Meanwhile, the reference signals are mapped to SC-FDMA symbols #2, #3, and #4, so that the code length of the orthogonal sequences is three.

Figure 14A:
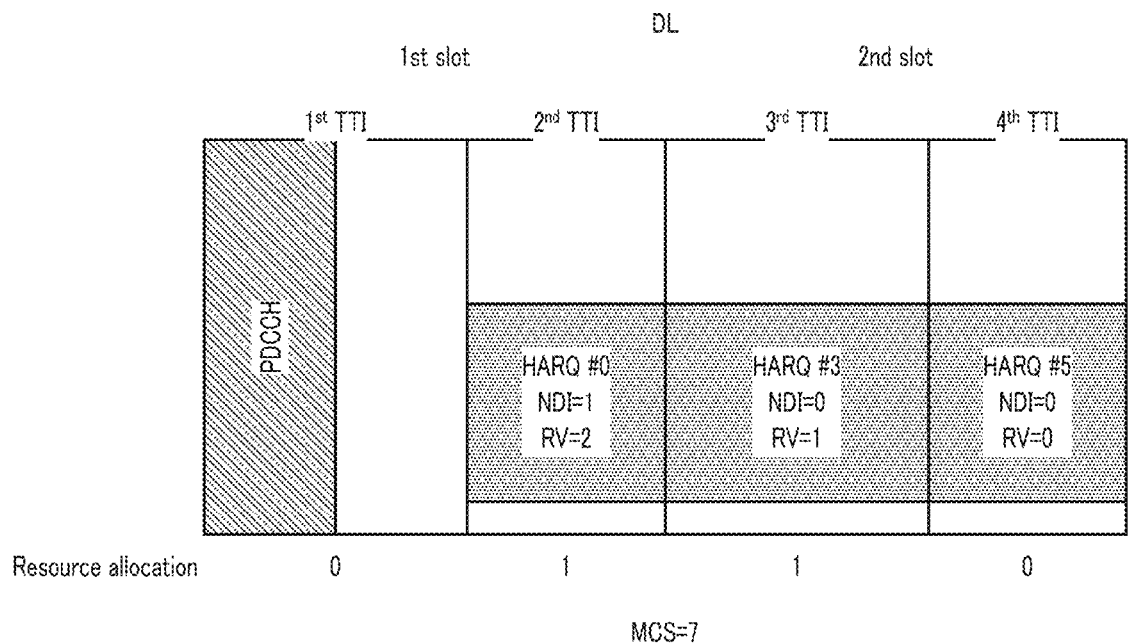
FIG. 14A is a diagram illustrating an example of DL assignments according to Embodiment 2.
Figure 14B:
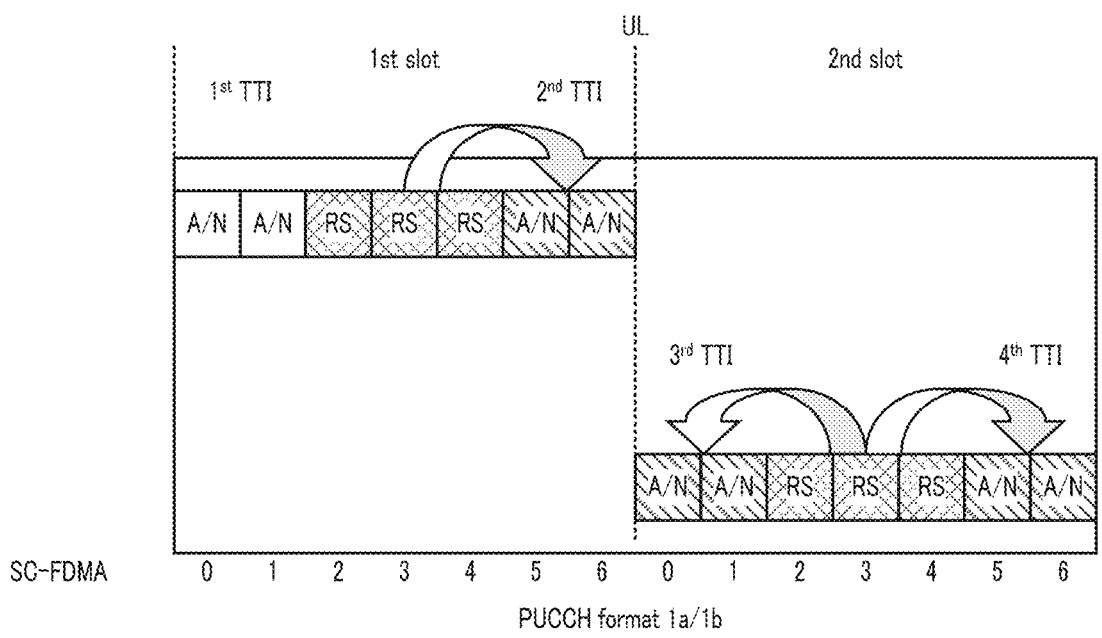
FIG. 14B is a diagram illustrating an example of UL ACK/NACK signal assignment according to Embodiment 2.

FIGS. 14A and 14B illustrate an operation example of four TTIs per subframe.

In DL illustrated in FIG. 14A, DL data signals are assigned in the $2^{nd}$, $3^{rd}$, and $4^{th}$ TTIs.

Moreover, in FIG. 14B, terminal 200 transmits ACK/NACK signals for the data signal assigned in the $2^{nd}$ TTI of DL, using SC-FDMA symbols #5 and #6 in the $1^{st}$ slot of UL. In this transmission, terminal 200 transmits the reference signals for the $2^{nd}$ TTI, using SC-FDMA symbols #2, #3, and #4 in the $1^{st}$ slot.

In FIG. 14B, terminal 200 transmits ACK/NACK signals for the DL data signal assigned in the $3^{rd}$ TTI of DL, using SC-FDMA symbols #0 and #1 in the $2^{nd}$ slot of UL, and transmits ACK/NACK signals for the data signal assigned in the $4^{th}$ TTI of DL, using SC-FDMA symbols #5 and #6 in the $2^{nd}$ slot of UL. In this transmission, terminal 200 transmits the reference signals for the $3^{rd}$ and $4^{th}$ TTIs, using SC-FDMA symbols #2, #3, and #4 in the $2^{nd}$ slot. In other words, the reference signals are shared between the $3^{rd}$ and $4^{th}$ TTIs.

Note that, when the last SC-FDMA symbol (SC-FDMA symbol #6) of the $2^{nd}$ slot of UL is reserved for an SRS, only one symbol (SC-FDMA symbol #5) is available for transmission of the ACK/NACK signals in the $4^{th}$ TTI. In this case, as a method of transmitting an ACK/NACK signal, the following two methods are available: a method of transmitting ACK/NACK signals using one symbol; and a method of transmitting ACK/NACK signals by bundling or multiplexing the ACK/NACK signals of the $3^{rd}$ TTI and the $4^{th}$ TTI.

"Bundling" is a method that reduces the number of bits when the number of ACK/NACK bits is greater than the number of transmittable bits, thus reducing the amount of information. Meanwhile, multiplexing is a method that is used when each ACK/NACK signal consists of one bit, and the bits are combined (multiplexed) into two bits and transmitted in Format 1c.

Although the method of transmitting ACK/NACK signals using one symbol deteriorates the reception quality of the ACK/NACK signals for the $4^{th}$ TTI, the method has an advantage in that the delay time of the ACK/NACK signals for the 3rd TTI does not have to be extended.

Meanwhile, the method of transmitting the ACK/NACK signals by bundling or multiplexing the ACK/NACK signals of the $3^{rd}$ and $4^{th}$ TTIs results in a longer delay time for the ACK/NACK signals for the $3^{rd}$ TTI, but has an advantage in that the reception quality of the bundled ACK/NACK signals can be secured. More specifically, terminal 200 maps the ACK/NACK signals to the SC-FDMA symbols #0, #1, and #5 of the $2^{nd}$ slot and configures the code length of the orthogonal sequences to be three.

<For 14 TTIs Per Subframe>

In the case of 14 TTIs per subframe, the SC-FDMA symbols used to transmit reference signals (RSs) run out when an ACK/NACK signal is transmitted in each TTI. For this reason, in Operation Example 1, terminal 200 bundles or multiplexes ACK/NACK signals in a plurality of TTIs to transmit the signals.

FIG. 15 illustrates allocation of PUCCH resources (SC-FDMA symbols) for transmitting ACK/NACK signals for DL data signals assigned in TTIs in a DL subframe in the case of 14 TTIs per subframe.

When DL data signals are assigned in a plurality of TTIs, terminal 200 bundles or multiplexes ACK/NACK signals to configure the number of SC-FDMA symbols used for transmitting the ACK/NACK signals to be two. Thus, as in the case of four TTIs per subframe, the code length of the orthogonal sequences of the ACK/NACK signals in each TTI becomes two. In addition, the reference signals are mapped to SC-FDMA symbols #2, #3, and #4, so that the code length of the orthogonal sequences is three.

As illustrated in FIG. 15, the SC-FDMA symbols #0 and #1 of the $1^{st}$ slot are shared by the ACK/NACK signals for the $1^{st}$ to $4^{th}$ TTIs, and the SC-FDMA symbols #5 and #6 of the $1^{st}$ slot are shared by the ACK/NACK signals for the $5^{th}$ to $7^{th}$ TTIs, while the SC-FDMA symbols #0 and #1 of the $2^{nd}$ slot are shared by the ACK/NACK signals for the $8^{th}$ to $11^{th}$ TTIs, and the SC-FDMA symbols #5 and #6 of the $2^{nd}$ slot are shared by the ACK/NACK signals for the $12^{th}$ to $14^{th}$ TTIs.

As a method of applying bundling or multiplexing in the case of 14 TTIs per subframe, when the total number of codewords of a plurality of TTIs is two or less, terminal 200 transmits signals corresponding to an ACK or NACK of each codeword, using BPSK or QPSK without applying bundling or multiplexing.

Meanwhile, in a case where the total number of codewords of a plurality of TTIs is three or greater, terminal 200 bundles (applies spatial bundling) ACK/NACK signals first, provided that a plurality of codewords is assigned in TTIs. As a bundling method, for example, a method is performed in accordance with a bundling method used in TDD carrier aggregation (see, FIG. 16).

In Operation Example 1, as illustrated in FIG. 15, ACK/NACK signals for up to four TTIs are transmitted as one signal, so that the number of ACK/NACK bits after spatial bundling is up to four. When the number of ACK/NACK bits after spatial bundling is two, terminal 200 uses QPSK to transmit the signals corresponding to the ACK or NACK.

Meanwhile, when the number of ACK/NACK bits after spatial bundling is three or four, terminal 200 further bundles the ACK/NACK signals over the TTIs. As a bundling method, a method is performed in accordance with, for example, a bundling method used in TDD carrier aggregation (see, FIG. 17). This bundling compresses the bits of the ACK/NACK signals into two bits.

FIG. 18 illustrates an operation example f 14 TTIs per subframe.

In the case where ACK/NACK signals are transmitted on SC-FDMA symbols #0 and #1 of the $1^{st}$ slot in FIG. 18, DL data signals are assigned in two TTIs including the $1^{st}$ and $2^{nd}$ TTIs, and the number of codewords for each of the signals is one, so that the total number of codewords is two.

In addition, in the case where ACK/NACK signals are transmitted on SC-FDMA symbols #5 and #6 of the $2^{nd}$ slot in FIG. 18, the DL data signals are assigned in a single TTI that is the $12^{th}$ TTI, and two codewords are assigned in MIMO transmission.

Thus, in these cases where the total number of codewords in a plurality of TTIs is two or less, terminal 200 transmits signals corresponding to an ACK or NACK of each codeword, using BPSK or QPSK.

Next, in the case where ACK/NACK signals are transmitted on SC-FDMA symbols #5 and #6 of the $1^{st}$ slot in FIG. 18, DL data signals are assigned in the three TTIs, namely, the $5^{th}$, $6^{th}$, and $7^{th}$ TTIs, and the number of codewords is one for each of the signals, so that the total number of codewords is three. In this case, terminal 200 follows the case illustrated in FIG. 17, and applies time domain bundling (3 to 2 bundling) to the ACK/NACK signals for the $5^{th}$, $6^{th}$, and $7^{th}$ TTIs. In FIG. 18, the ACK/NACK signals for the three TTIs are an ACK, ACK, and ACK, so that the ACK/NACK signals after bundling become an ACK and ACK.

In addition, in the case where ACK/NACK signals are transmitted on SC-FDMA symbols #0 and #1 of the $2^{nd}$ slot in FIG. 18, the DL data signals are assigned in the four TTIs, namely, the $8^{th}$, $9^{th}$, $10^{th}$, and $11^{th}$ TTIs, and two codewords are assigned in MIMO transmission in each TTI. Accordingly, the total number of codewords is eight. In this case, terminal 200 applies spatial bundling to ACK/NACK signals in each TTI in accordance with FIG. 16, and then applies time domain bundling (4 to 2 bundling) to the ACK/NACK signals over the TTIs in accordance with FIG. 17 to compress the bits of the ACK/NACK signals into two bits. In FIG. 18, the ACK/NACK signals in each TTI after spatial bundling become an ACK, ACK, NACK, and NACK, and the ACK/NACK signals after time domain bundling become a NACK and ACK.

Note that, in Operation Example 1, an assumption is made that the method of assigning a plurality of TTIs, which is described in Embodiment 1 is used, so that, when terminal 200 successfully receives the DCI, all the DL data assignments for TTIs in the same subframe can be successfully received as well. For this reason, terminal 200 does not erroneously count the total number of codewords. This is another advantage of Embodiment 1. Accordingly, terminal 200 applies bundling or multiplexing only to the TTIs in which data assignment is performed, thereby transmitting the ACK/NACK signals in the compressed manner.

Operation Example 2

In Operation Example 2, terminal 200 applies bundling or multiplexing to ACK/NACK signals generated in each TTI and maps the signal over ACK/NACK resources within a single UL subframe.

With this configuration, PUCCH frequency hopping can be supported.

In Operation Example 2, terminal 200 uses an existing PUCCH format regardless of the number of TTIs within one subframe. Thus, the PUCCH resources can be advantageously shared with traditional UEs.

For example, when PUCCH format 1a/1b is used while PUCCH format 3 is not used, terminal 200 compresses the ACK/NACK signals in all the TTIs into two bits. The compression method used herein is to apply time domain bundling over the TTIs after spatial bundling is applied to the ACK/NACK signals of a plurality of codewords in the TTIs as in the case of Operation Example 1 of this embodiment (see FIGS. 16 and 17).

Note that, when the number of TTIs assigned per subframe is two, the ACK/NACK signals can be compressed into two bits by spatial bundling, so that time domain bundling over TTIs becomes unnecessary.

When the number of TTIs assigned per subframe is three or four, terminal 200 applies time domain bundling over TTIs in addition to spatial bundling. Time domain bundling is applied in accordance with FIG. 17. When application of channel selection is predetermined, terminal 200 can transmit an ACK/NACK signal of three or four bits without using time domain bundling.

Moreover, when the number of TTIs assigned per subframe is five or greater, terminal 200 compresses the ACK/NACK signals into four bits when application of channel selection is predetermined. Meanwhile, when application of channel selection is not predetermined, terminal 200 compresses the ACK/NACK signals into two bits. For the method used in compressing the ACK/NACK signals of five bits or more into ACK/NACK signals of two bits, the method illustrated in FIG. 17 may be used.

In a case where transmission using PUCCH format 3 is allowed by an upper layer signal, terminal 200 can transmit a plurality of ACK/NACK signals using PUCCH format 3. In this case, terminal 200 can transmit the ACK/NACK signals without compression, which is advantageous in that the information amount of the ACK/NACK signals is not reduced.

Note that, although the case where ACK/NACK signals are transmitted using PUCCH resources has been described in Embodiment 2, when a UL data signal is assigned in a subframe and a TTI for transmitting PUCCH, a method to transmit ACK/NACK signals on the UL data signal may be used. In this case, when at least one of a plurality of UL TTIs has the assignment of a UL data signal, terminal 200 may transmit a plurality of ACK/NACK signals for a DL TTI, using the TTI for the UL data signal. In this case, a mixture of a PUCCH format and PUSCH format can be avoided in the UL subframes, so that terminal 200 can advantageously transmit a subframe in a single format.

Operation Examples 1 and 2 have been described thus far.

As described above, in Embodiment 2, when transmitting an ACK/NACK signal for a DL data signal transmitted in a shortened TTI, using a PUCCH resource, terminal 200 maps, to an earlier time resource (SC-FDMA symbol) among PUCCH resources, an ACK/NACK signal corresponding to an earlier time TTI among a plurality of shortened TTIs. With this configuration, an ACK/NACK signal corresponding to an earlier TTI is fed back to base station 100 at an earlier time among the plurality of shortened TTIs within one subframe, thereby enabling a reduction in delay of ACK/NACK signals.

In addition, a reference signal mapped in a slot is shared between TTIs corresponding to ACK/NACK signals mapped in this slot in Embodiment 2. Thus, a reference signal does not have to be mapped in each TTI.

Note that, the description has been given in Embodiment 2 with the assumption that base station 100 notifies terminal 200 of assignments of a plurality of TTIs using a single DCI as in Embodiment 1. However, in Embodiment 2, the method to indicate assignments of a plurality of TTIs is not limited to the method described in Embodiment 1, and a different method may be used. For example, the method according to Embodiment 2 can be applied to a case where a DL data signal is assigned using a DCI for each TTI, rather than the method to assign a plurality of TTIs used in Embodiment 1. In this case, there may be a TTI for which terminal 200 fails to detect (misdetection) the DCI among a plurality of TTIs although base station 100 has transmitted the DCI. In this case, base station 100 adds information on the number of assigned TTIs to the DCIs, thereby designating a TTI that is a bundling or multiplexing target. Thus, base station 100 and terminal 200 can treat the TTI that cannot be detected by terminal 200, as DTX, and can handle the TTI in the same way as NACK.

In addition, the method of compressing ACK/NACK signals based on FDD has been described in Embodiment 2. However, for application to TDD, the method according to Embodiment 2 can be applied by further applying bundling over subframes.

Each embodiment of the present disclosure has been described thus far.

The embodiments have been described with an example in which an aspect of the present disclosure is implemented using a hardware configuration by way of example, but the present disclosure may also be implemented by software in cooperation with hardware.

In addition, the functional blocks used in the descriptions of the embodiments are typically implemented as LSI devices, which are integrated circuits. The integrated circuits may control the functional blocks used in the descriptions of the embodiments and may include an input and output. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A base station according to this disclosure includes: a generation section that generates one piece of downlink control information (DCI) containing control information for a plurality of first transmission time intervals (TTIs) each having a TTI length shorter than a second TTI; and a transmission section that transmits the DCI, in which control information on retransmission processing for a data signal is configured for each of the plurality of first TTIs while control information other than the control information on the retransmission processing is configured in common among the plurality of first TTIs in the DCI.

In the base station according to this disclosure, the DCI contains information indicating the presence or absence of an assignment for each of the plurality of first TTIs.

In the base station according to this disclosure, control information on retransmission processing for a downlink data signal is information indicating an HARQ process number, a new data indicator (NDI), a redundancy version (RV), or a combination of a plurality of transport blocks and codewords in the DCI.

In the base station according to this disclosure, control information on retransmission processing for an uplink data signal is a new data indicator (NDI) in the DCI.

In the base station according to this disclosure, the transmission section transmits physical HARQ indicator channel (PHICH) containing an ACK/NACK signal for an uplink data signal assigned in a TTI in which non-adaptive retransmission is performed among the plurality of first TTIs, and the transmission section transmits the DCI containing the NDI for an uplink data signal assigned in a TTI in which adaptive retransmission is performed among the plurality of first TTIs, in which the DCI contains no assignment for the TTI in which non-adaptive retransmission is performed.

In the base station according to this disclosure, the transmission section transmits the DCI containing the NDI for an uplink data signal assigned in the plurality of first TTIs in which adaptive retransmission is performed, and the transmission section transmits no physical HARQ indicator channel (PHICH).

In the base station according to this disclosure, the plurality of first TTIs is placed in one subframe.

In the base station according to this disclosure, the plurality of first TTIs is placed in one slot.

The base station according to this disclosure further includes a reception section that receives an ACK/NACK signal for a downlink data signal transmitted in the first TTIs, in which the ACK/NACK signal for a downlink data signal transmitted in an earlier time TTI among the first TTIs is mapped to an earlier time resource among uplink resources.

In the base station according to this disclosure, the reception section receives a reference signal, in which the reference signal is shared between TTIs placed in the same slot as that in which the ACK/NACK signal is mapped among the plurality of first TTIs.

The base station according to this disclosure further includes a reception section that receives an ACK/NACK signal for a downlink data signal transmitted in the first TTIs, in which the ACK/NACK signals corresponding respectively to the first TTIs are bundled or multiplexed and then mapped over ACK/NACK resources within one subframe.

A terminal according to the present disclosure includes: a reception section that receives one piece of downlink control information (DCI) containing control information for a plurality of first transmission time intervals (TTIs) each having a TTI length shorter than a second TTI; a signal demultiplexing section that demultiplexes a downlink data signal from a received signal using the DCI; and a signal assignment section that assigns an uplink data signal to an uplink resource using the DCI, in which control information on retransmission processing for a data signal is configured for each of the plurality of first TTIs while control information other than the control information on the retransmission processing is configured in common among the plurality of first TTIs in the DCI.

A communication method according to the present disclosure includes: generating one piece of downlink control information (DCI) containing control information for a plurality of first transmission time intervals (TTIs) each having a TTI length shorter than a second TTI; and transmitting the DCI, in which control information on retransmission processing for a data signal is configured for each of the plurality of first TTIs while control information other than the control information on the retransmission processing is configured in common among the plurality of first TTIs in the DCI.

A communication method according to the present disclosure includes: receiving one piece of downlink control information (DCI) containing control information for a plurality of first transmission time intervals (TTIs) each having a TTI length shorter than a second TTI; demultiplexing a downlink data signal from a received signal using the DCI; and assigning an uplink data signal to an uplink resource using the DCI, in which control information on retransmission processing for a data signal is configured for each of the plurality of first TTIs while control information other than the control information on the retransmission processing is configured in common among the plurality of first TTIs in the DCI.

INDUSTRIAL APPLICABILITY

An aspect of this disclosure is useful in mobile communication systems.

REFERENCE SIGNS LIST

100 Base station
101 TTI determination section
102 MCS determination section
103 PDCCH generation section
104, 208 Error correction coding section
104, 209 Modulation section
106, 210 Signal assignment section
107, 211 Transmission section
108, 201 Reception section
109, 202 Signal demultiplexing section
110 PUCCH receiving section
111, 203 Demodulation section
112, 204 Error correction decoding section
113 ACK/NACK determination section
200 Terminal
205 Error determination section
206 ACK/NACK generation section
207 PDCCH receiving section

The invention claimed is:

1. A base station comprising:
a generator, which, in operation, generates downlink control information (DCI) used for scheduling time domain units; and
a transmitter, which, in operation, transmits the DCI, wherein
the DCI includes first control information respectively configured for the time domain units and second control information configured for all of the time domain units, and the second control information includes a modulation and coding scheme (MCS) and a frequency resource assignment.

2. The base station according to claim 1, wherein the DCI includes information indicating whether each of the time domain units is assigned or not.

3. The base station according to claim 1, wherein the first control information includes at least one of information indicating an HARQ process number, a new data indicator (NDI), a redundancy version (RV), or a combination of a plurality of transport blocks and codewords.

4. The base station according to claim 1, wherein the DCI is used for scheduling the time domain units for an uplink data signal.

5. The base station according to claim 1, wherein the time domain units are included in one subframe.

6. The base station according to claim 1, wherein the time domain units are included in one slot.

7. The base station according to claim 1, wherein each of the time domain units is shorter than one subframe.

8. The base station according to claim 1, wherein each of the time domain units is shorter than one slot.

9. A communication method comprising:
generating downlink control information (DCI) used for scheduling time domain units; and
transmitting the DCI, wherein
the DCI includes first control information respectively configured for the time domain units and second control information configured for all of the time domain units, and the second control information includes a modulation and coding scheme (MCS) and a frequency resource assignment.

10. The communication method according to claim 9, wherein the DCI includes information indicating whether each of the time domain units is assigned or not.

11. The communication method according to claim 9, wherein the first control information includes at least one of information indicating an HARQ process number, a new data indicator (NDI), a redundancy version (RV), or a combination of a plurality of transport blocks and codewords.

12. The communication method according to claim 9, wherein the DCI is used for scheduling the time domain units for an uplink data signal.

13. The communication method according to claim 9, wherein the time domain units are included in one subframe.

14. The communication method according to claim 9, wherein the time domain units are included in one slot.

15. The communication method according to claim 9, wherein each of the time domain units is shorter than one subframe.

16. The communication method according to claim 9, wherein each of the time domain units is shorter than one slot.

* * * * *